(12) United States Patent
Gyorfi et al.

(10) Patent No.: US 9,110,663 B2
(45) Date of Patent: Aug. 18, 2015

(54) INITIALIZE A COMPUTING DEVICE TO PERFORM AN ACTION

(71) Applicant: Motorola Mobility LLC, Libertyville, IL (US)

(72) Inventors: Julius S Gyorfi, Vernon Hills, IL (US); Jagatkumar V Shah, Lake in the Hills, IL (US); Travis Roland Beals, Mountain View, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/168,084

(22) Filed: Jan. 30, 2014

(65) Prior Publication Data
US 2014/0208128 A1 Jul. 24, 2014

Related U.S. Application Data

(63) Continuation of application No. 13/746,917, filed on Jan. 22, 2013, now abandoned.

(51) Int. Cl.
| | |
|---|---|
| *G06F 9/54* | (2006.01) |
| *G06F 1/32* | (2006.01) |
| *G06F 3/01* | (2006.01) |
| *G06F 9/445* | (2006.01) |

(52) U.S. Cl.
CPC .............. *G06F 1/3206* (2013.01); *G06F 1/32* (2013.01); *G06F 3/01* (2013.01); *G06F 9/445* (2013.01); *G06F 9/542* (2013.01); *Y02B 60/144* (2013.01); *Y02B 60/185* (2013.01)

(58) Field of Classification Search
CPC ..... G06F 3/017; G06F 3/0488; G06F 1/3262; G06F 1/3265; G06F 1/32; G06F 1/1694; G06F 1/3203; G09G 2330/021
See application file for complete search history.

(56) References Cited

U.S. PATENT DOCUMENTS

| | | | |
|---|---|---|---|
| 7,306,567 B2 | 12/2007 | Loree, IV | |
| 7,522,031 B2 | 4/2009 | Lim | |
| 7,999,855 B2 | 8/2011 | Grosvenor | |
| 8,075,499 B2 | 12/2011 | Nathan et al. | |

(Continued)

FOREIGN PATENT DOCUMENTS

| | | |
|---|---|---|
| WO | 2006120211 A1 | 11/2006 |
| WO | 2008072168 A1 | 6/2008 |
| WO | 2011056657 A2 | 5/2011 |

OTHER PUBLICATIONS

Hong Lu et al., "SpeakerSense: Energy Efficient Unobtrusive Speaker Identification on Mobile Phones", Proc. of the 9th Int'l Conf. on Pervasive Computing, 2011, pp. 188-205.

(Continued)

*Primary Examiner* — Tuan Dao

(57) ABSTRACT

A method uses a computing device that includes a first processor in a first, inactive state operatively coupled to a second processor in an active state. While the first processor is in the first state (301) the second processor uses sensors to determine (303) that a first condition occurred. In response to determining that the first condition has occurred, the first processor initializes (305) to a second, active state. If the first or second processor determines (311) that a second condition has occurred within a given time period (307 and 309) after the first condition occurred, the first processor performs (315) a first action such as launching a software application, capturing a digital photograph, or placing a phone call.

11 Claims, 13 Drawing Sheets

(56) References Cited

U.S. PATENT DOCUMENTS

| | | |
|---|---|---|
| 8,115,875 B2 | 2/2012 | Takuma |
| 8,234,512 B2 | 7/2012 | Mucignat et al. |
| 2004/0214146 A1 | 10/2004 | Harris et al. |
| 2006/0053315 A1 | 3/2006 | Menzl |
| 2008/0158185 A1* | 7/2008 | Westerman ............ 345/173 |
| 2008/0215901 A1 | 9/2008 | Beard |
| 2009/0113550 A1* | 4/2009 | Costa et al. ............ 726/25 |
| 2009/0164219 A1 | 6/2009 | Yeung et al. |
| 2009/0249236 A1 | 10/2009 | Westerman et al. |
| 2010/0033422 A1* | 2/2010 | Mucignat et al. ......... 345/156 |
| 2010/0235746 A1* | 9/2010 | Anzures ............ 715/723 |
| 2010/0313050 A1 | 12/2010 | Harrat et al. |
| 2011/0050428 A1 | 3/2011 | Istoc |
| 2011/0080349 A1* | 4/2011 | Holbein et al. ......... 345/173 |
| 2011/0264928 A1 | 10/2011 | Hinckley |
| 2012/0007713 A1* | 1/2012 | Nasiri et al. ............ 340/5.81 |
| 2012/0016641 A1 | 1/2012 | Raffa et al. |
| 2012/0075248 A1* | 3/2012 | Chang et al. ............ 345/174 |
| 2012/0140451 A1 | 6/2012 | Araujo et al. |
| 2013/0162600 A1* | 6/2013 | Chou et al. ............ 345/175 |
| 2013/0198685 A1* | 8/2013 | Bernini et al. ............ 715/800 |

OTHER PUBLICATIONS

Tushar Janefalkar et al., "Portable Electronic Device and Method for Controlling Operation Thereof Based on User Motion", U.S. Appln. No. 13/414,585, filed Mar. 7, 2012, 27 pages.

William P. Alberth et al., "Portable Electronic Device and Method for Controlling Operation Thereof Taking into Account Which Limb Possesses the Electronic Device", U.S. Appl. No. 13/358,951, filed Jan. 26, 2012, 38 pages.

Patent Cooperation Treaty, "PCT Search Report and Written Opinion of the International Searching Authority" for International Application No. PCT/US2013/024935, dated May 13, 2013, 11 pages.

U.S. Appl. No. 13/746,917, filed Jan. 22, 2013, entitled "Initialize a Computing Device to Perform an Action".

Non-Final Office Action mailed Mar. 11, 2014 for U.S. Appl. No. 13/746,917, 37 pages.

Final Office Action mailed Sep. 18, 2014 for U.S. Appl. No. 13/746,917, 32 pages.

* cited by examiner

US 9,110,663 B2

INITIALIZE A COMPUTING DEVICE TO PERFORM AN ACTION

FIELD OF USE

This application generally relates to a computing device, and in particular, to initializing a computing device to perform an action.

BACKGROUND

In a portable computing device such as a smartphone, multiple time-consuming steps are required to transition the computing device from an inactive state to an active state capable of performing an action using the device. For example, a typical smartphone takes several seconds for a user to remove the smartphone from a pocket or purse, activate a camera application, and take a snapshot using the camera function of the smartphone. Further, additional time may be required for a user to enter an unlock code on the device prior to activating the camera function.

Accordingly, there is an opportunity to improve the speed and usability of a computing device transitioning from an inactive state to an active state capable of performing an action using the device.

BRIEF DESCRIPTION OF THE FIGURES

The present disclosure is illustrated by way of examples, embodiments, and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments, and the like and explain various principles and advantages, in accordance with the present disclosure, where.

DETAILED DESCRIPTION

This disclosure provides example methods and devices for initializing a computing device to perform an action. An optional first phase, triggered by certain sensors, such as low-power sensors operatively coupled to a low-power processor of the computing device, may be used to initiate a warm-up processing function of a main processor of the computing device. A second phase, triggered by different sensors such as higher-power sensors, may be used to prepare the computing device for a first action and perform the first action such as launching a camera application. Optionally, a third phase, triggered by any available sensors, may be used to perform a second action such as taking a picture using the camera application. Configuring a computing device in accordance with various aspects described herein may provide increased usability of the computing device.

In one aspect, power consumption of the computing device may be decreased because, initially, only low-power sensors are being used. In another aspect, perceived reaction time of the computing device may be improved because a warm-up processing function supports quicker performance of the first action relative to the first action being performed without a warm-up phase. In a third aspect, the use of different sets of sensors reinforces proper computing device-interpretation of intentional actions from the user and rejects interpretations of user actions that may result in a false positive or false negative. In a fourth aspect, user interactions with the computing device may be orientation-independent so that the computing device may perform the warm-up and/or the first action while the user is positioning the device. Especially for computing device applications that have a noticeable launch or start-up time, such as a camera application, a browser application, or a dialer application, teachings from this disclosure may assist the computing device in accurately performing an action that a user desires. A computing device may be referred to as a mobile station (MS), terminal, cellular phone, cellular handset, personal digital assistant (PDA), smartphone, wireless phone, organizer, handheld computer, desktop computer, laptop computer, tablet computer, set-top box, gaming console, television, appliance, medical device, display device, or some other like terminology.

Figure 1:
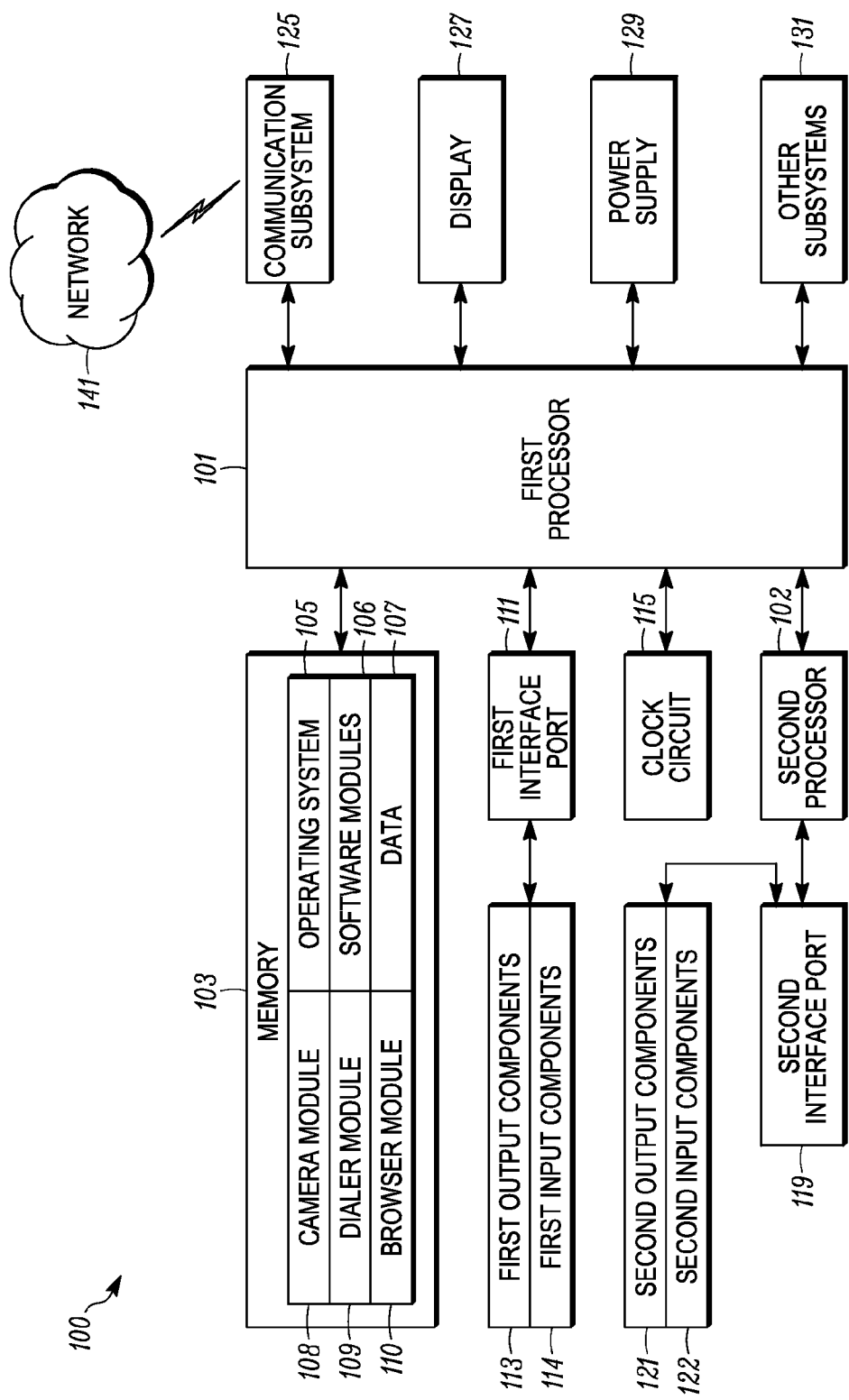
FIG. 1 is a block diagram illustrating one embodiment of a computing device in accordance with various aspects set forth herein.

FIG. 1 is a block diagram illustrating one embodiment of a computing device 100 in accordance with various aspects set forth herein. In FIG. 1, the computing device 100 may be configured to include a first processor 101 operatively coupled to a second processor 102, a memory 103, an interface port 111, a clock circuit 115, a communication subsystem 125, a display 127, a power supply 129, another subsystem 131, another component, or any combination thereof. The first processor 101 may be configured to control and perform various functions associated with the control or operation of the computing device 100. Further, the first processor 101 may be a primary processor. The second processor 102 may also be configured to control and perform various functions associated with the control or operation of the computing device 100. The second processor 102 may be a secondary processor either physically integrated or physically distinct from the first processor. In one example, the second processor 102 may be a low power processor. In another example, the second processor 102 may be a low power sensor hub. In another example, the second processor 102 may be a low power sensor controller. In another example, the second processor 102 may be in an active mode while the first processor 101 is in an inactive mode. In some circumstances, the second processor 102 may wake-up the first processor 101. A person of ordinary skill will recognize various configurations for multiple processors to optimize, for instance, power consumption, cost, or performance.

In the current embodiment, the memory 103 stores instructions for an operating system 105, a software module 106, data 107, a camera application module 108, a dialer application module 109, a browser application module 110, a system program, an application, a utility, or any combination thereof. In one definition, data is information in a form suitable for use by a computer. A person having ordinary skill in the art will recognize that the subject matter of this disclosure may be implemented using various operating systems or combinations of operating systems. The memory 103 may be configured to include a random access memory (RAM), a static RAM (SRAM), a dynamic RAM (DRAM), a read only memory (ROM), a volatile memory, a non-volatile memory, a cache memory, a hard drive memory, a virtual memory, a smartcard memory such as a subscriber identity module or a removable user identity module (SIM/RUIM), another memory, or any combination thereof. In one example, the memory 103 refers to a combination of volatile and non-volatile memories. The first processor 101 may execute program instructions stored in memory 103 and associated with the operating system 105, the software module 106, the camera application module 108, the dialer application module 109, the browser application module 110, a system program, an application, a utility, or any combination thereof. Further, the processor 101 may read or write the data 107 stored in the memory 103.

In FIG. 1, the first processor 101 may be configured to use first output components 113 via the first interface port 111. The first interface port 111 may include a serial port, a parallel port, a general purpose input and output (GPIO) port, a game port, a universal serial bus (USB), a micro-USB port, a high definition multimedia (HDMI) port, a video port, an audio port, a Bluetooth transceiver, a near-field communication (NFC) port, another like interface port, or any combination thereof. A person of ordinary skill will recognize that an output component may use the same type of interface port as an input component. For example, a USB port may provide input to and output from the computing device 100. The first output components 113 may include a speaker, a sound card, a video card, a display, a monitor, a printer, an actuator, a smartcard, another output component, or any combination thereof. In one example, the first output components 113 may include an audio loudspeaker, a haptic actuator, and an electronic display portion of a touch screen.

In the current embodiment, the first processor 101 may use first input components 114 via the first interface port 111 to allow information to be received by the computing device 100. The first input components 114 may include a mouse, a trackball, a directional pad, a trackpad, a touch-sensitive display, a scroll wheel, a digital camera (still or video), a web camera, a microphone, a sensor, a smartcard, combinations, or the like. The sensor may be, for instance, a presence sensor, a motion sensor, a sound sensor, a force sensor, an optical sensor, a photon sensor, another like sensor, or any combination thereof. A presence sensor may be, for instance, a touch-sensitive display, a touch sensor based on capacitive, resistive, force-sensing, or surface acoustic wave technology, a proximity sensor based on infrared light technology, a mechanical switch, a stress sensor, a temperature sensor, a conductivity sensor, a visible light-based sensor, a magnetometer, the like, or any combination thereof. A sound sensor may be a microphone such as a low-fidelity microphone or a high-fidelity microphone. A motion sensor may be, for instance, an accelerometer, a gyroscope, a magnetometer, a tilt sensor, a force sensor, or the like. For example, the first input components 114 may include a capacitive touch panel portion of a touch screen, a digital camera, and a microphone.

In this embodiment, the second processor 102 may use second output components 121 via a second interface port 119. The second interface port 119 may include a serial port, a parallel port, a GPIO port, a game port, a USB, a micro-USB port, an HDMI port, a video port, an audio port, a Bluetooth transceiver, an NFC port, another like interface port, or any combination thereof. The second output components 121 may include a speaker, a sound card, a video card, a display, a monitor, a printer, an actuator, a smartcard, another output component, or any combination thereof. In one example, the second output components 121 consume less power than the first output components 113 and may include a light-emitting diode or a low-power organic light-emitting diode (OLED) display.

In FIG. 1, the second processor 102 may use second input components 122 via the second interface port 119 to enable information to be received by the computing device 100. The second input components 122 may include a mouse, a trackball, a directional pad, a trackpad, a touch-sensitive display, a scroll wheel, a digital camera (still or video), a web camera, a microphone, a sensor, a smartcard, combinations, or the like. The sensor may be, for instance, a presence sensor, a motion sensor, a sound sensor, a force sensor, an optical sensor, a photon sensor, another like sensor, or any combination thereof. A presence sensor may be, for instance, a touch-sensitive display, a touch sensor based on capacitive, resistive, force-sensing, or surface acoustic wave technology, a proximity sensor based on infrared light technology, a mechanical switch, a stress sensor, a temperature sensor, a conductivity sensor, a visible light-based sensor, a magnetometer, the like, or any combination thereof. A sound sensor may be a microphone such as a low-fidelity microphone or a high-fidelity microphone. A motion sensor may be, for instance, an accelerometer, a gyroscope, a magnetometer, a tilt sensor, a force sensor, or the like. For example, the second input components 122 consume less power than the first input components 114 and may include an accelerometer, a low-fidelity microphone, and an ambient light sensor.

In this embodiment, the computing device 100 may be configured to communicate with a network 141 using the communication subsystem 125. The communication functions of the communication subsystem 125 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 125 includes cellular communication, Wi-Fi communication, Bluetooth communication, and GPS communication. The network 141 may encompass wired and wireless communication networks such as a local-area network (LAN), a wide-area network (WAN), a personal-area network (PAN), a computer network, a wireless network, a telecommunications network, another like network or any combination thereof. For example, the network 141 may be a cellular network, a Wi-Fi network, and a near-field network.

Although the display 127 is separately shown here in FIG. 1, the display may be considered an output component such as a first output component 113 or a second output component 121. Additionally, if the display 127 is a touchscreen, it may also be considered an input component such as a first input component 114 or a second input component 122. In one definition, a touch-sensitive display is an electronic visual display that may detect the presence and location of a touch, gesture, or object near its display area. In one definition, the term "near" means on, proximate, or associated with. In another definition, the term "near" is the extended spatial location of. The computing device 100 receives power from the power supply 129. The power supply 129 may be, for instance, from a rechargeable battery, an alternating current (AC) source, another power source, or any combination thereof. The computing device 100 may also include the clock circuit 115 to provide one or more clock signals to the various components and elements of the computing device 100.

Figure 2:
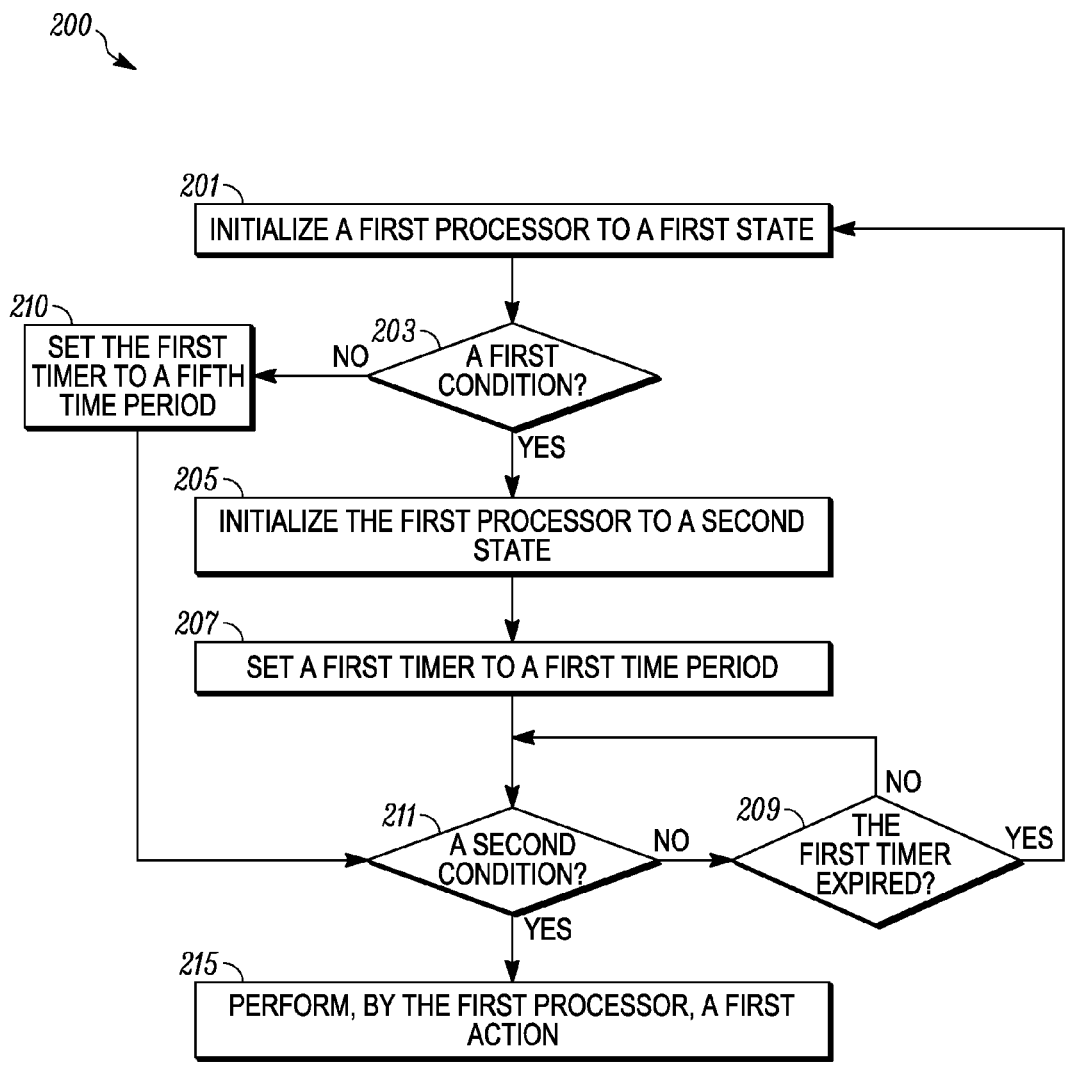
FIG. 2 is a flow chart illustrating one embodiment of a method of initializing a computing device to perform an action with various aspects described herein.

FIG. 2 is a flow chart 200 illustrating one embodiment of a method of initializing a computing device, such as the computing device 100 of FIG. 1, to perform an action with various aspects described herein. In FIG. 2, the method may begin by initializing 201 the first processor 101 to a first state. In one example, the first state may be a sleep, idle, inactive, or other low-power mode of operation. In another example, the first state may be associated with reducing the frequency of a system clock, generated by a clock circuit 115, provided to the first processor 101. In yet another example, the first state may include disconnecting one or more clocks to the processor 101. In a further example, the first state may involve reducing the power supply voltage to the processor 101.

Because the first processor 101 is in the first state, the second processor 102 determines 203 that a first condition has occurred. Several examples of methods for determining that a first condition has occurred will be described with reference to FIGS. 4-7. In response to determining that the first condition has occurred, the computing device 100 initializes 205 the first processor 101 to a second state. In one example, the second state may be an active mode of operation. In another example, the first processor 101 in the second state uses an increased system clock frequency, as generated by a clock circuit 115. In yet another example, the second state may include reconnecting one or more clocks to the processor 101. In a further example, the second state may involve increasing the power supply voltage to the processor 101. The initialization of the first processor 101 to the second state may be associated with waking-up the first processor 101. For example, initializing the first processor 101 may initiate a kernel operation of an operating system, such as operating system 105 of FIG. 1, and enable the first processor 101 to monitor a sensor, such as a first input component 114 of FIG. 1. In one example, during initialization, the computing device 100 may also activate the display 127. In another example, during initialization, the computing device 100, may start the communication subsystem 125 in preparation for transferring data or commencing a phone call. In another example, during initialization, the computing device 100, may activate various sensors associated with the first processor 101 or the second processor 102.

In FIG. 2, the computing device 100 may set 207 a first timer to a first time period. In one example, the first time period may be sufficient to allow a user to meet a second condition within a reasonable time period after the first condition. In another example, the first time period may be ten (10) seconds. If the first timer expires 209 prior to the method determining that a second condition has occurred 211, then the method may again initialize 201 the first processor 101 to the first state. This return to initialization 201 after the first condition occurs, but when the second condition does not occur within the first time period, may return the first processor 101 from a higher-power second state to a lower-power first state. In this situation, the first processor 101 had moved to a second state in anticipation of a second condition, but when the second condition was not fulfilled within the first time period, the first processor 101 returned to the first state.

Although the first condition has not occurred 203, the method may set 210 the first timer to a fifth time period. In one example, the fifth time period may be multiple milliseconds. In another example, the fifth time period may be one hundred (100) milliseconds. This fifth time period supports an alternate path to determining, by the second processor 102, if the second condition has occurred 211 prior to an expiration of the first timer. Thus, even when the first condition does not occur prior to the second condition, the second processor 102 and its associated input components 122 may detect the second condition.

In this embodiment, in response to determining, by the second processor 102 (through branch 205 or 210) or the first processor 101 (through branch 205), that the second condition has occurred prior to the expiration of the first timer, the first processor 101 performs 215 a first action. In one example, the first action may include securely unlocking the computing device, which allows the computing device to be used for limited purposes such as (a) taking photographs or videos but not viewing or transmitting photographs or videos or accessing other capabilities of the computing device or (b) receiving phone calls but not initiating phone calls or accessing other capabilities of the computing device or (c) opening a browser to perform a search but limiting access to other capabilities of the computing device. In another example, the first action may include launching a software application such as a camera application, a phone dialer application, or a browser application. If the first processor 101 was previously initialized to the second state per block 205, the first action may be performed faster than if the first processor 101 was still in the first state per branch 210 when the second condition was detected.

In accordance with the flow chart 200 of FIG. 2, a user may satisfy the first and second conditions, or simply the second condition, to instruct the computing device to perform a first action. If the first condition preceded the second condition within the first time period, the first processor 101 in the second state could perform the first action more quickly than if the first processor 101 was in the first state when the second condition occurred. Still, even if the first condition did not precede the second condition, the first processor 101 can still perform the first action starting from the first state. By carefully observing user behavior and intelligently defining first conditions, second conditions, and time periods, a computing device may seem to anticipate when a user intends to perform a first action and warm up the first processor 101 from a lower-power state to a higher-power state after a first condition is satisfied and prior to the user interacting with the computing device to satisfy the second condition. This has an advantage of decreasing the reaction time of the computing device relative to satisfying the second condition.

Figure 3:
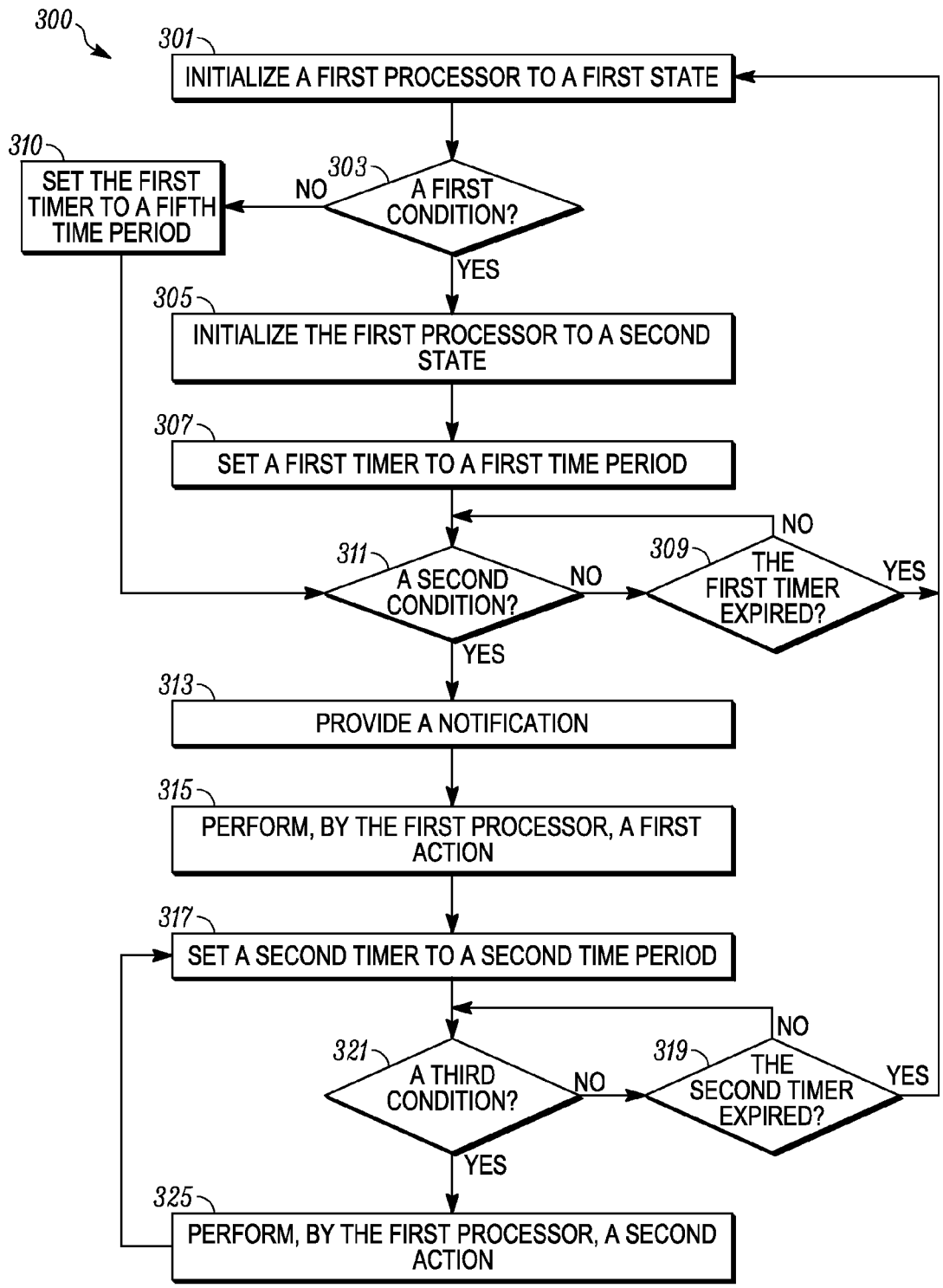
FIG. 3 is a flow chart illustrating another embodiment of a method of initializing a computing device to perform an action with various aspects described herein.

FIG. 3 is a flow chart 300 illustrating another embodiment of a method of initializing a computing device, such as the computing device 100 of FIG. 1, to perform an action with various aspects described herein. In FIG. 3, the flow chart 300 may begin by initializing 301 the first processor 101 to a first state as previously described with respect to FIG. 2 block 201. Because the first processor 101 is in the first state, the second processor 102 determines 303 that a first condition has occurred. Several examples of determining that a first condition has occurred will be described with respect to FIGS. 4-7. In response to determining that the first condition has occurred, the computing device 100 initializes 305 the first processor 101 to a second state as previously described with respect to FIG. 2 block 205.

In FIG. 3, the computing device 100 may set 307 a first timer to a first time period as previously described with respect to FIG. 2 block 207. If the first timer expires 309 prior to the method determining that a second condition has occurred 311, then the flow chart 300 may again initialize 301 the first processor 101 to the first state. This return to block 301 after the first condition occurs, but when the second condition does not occur within the first time period, may return the first processor 101 from a higher-power second state to a lower-power first state. In this situation, the first processor 101 had moved to a second state in anticipation of a second condition, but when the second condition was not fulfilled within the first time period, the first processor 101 returned to the first state.

Although the first condition has not occurred 303, the method may set 310 the first timer to a fifth time period as previously described with respect to FIG. 2 block 210. The first processor 101 or the second processor 102 may determine 311 that a second condition has occurred prior to an expiration of the first timer. Thus, even when the first condition does not occur prior to the second condition, the second processor 102 and its associated input components 122 may detect the second condition.

In the current embodiment, in response to determining, by the second processor 102 (through branch 305 or 310) or the first processor 101 (through branch 305), that the second condition has occurred prior to the expiration of the first timer, the method may provide 313 a notification to the computing device. In one example, the method may provide a tactile vibration using a haptic output component 113. In another example, the method may provide a visual notification by flashing an LED output component 121 or turning on part of an OLED or LCD display. In yet another example, the method may provide an audio notification using a speaker output component 113. Various configurations of output components 113, 121 may be used to provide notifications, and different notifications may be provided in response to different detected second conditions.

Further, in response to determining that the second condition has occurred 311 prior to the expiration of the first timer, the first processor 101 performs 315 a first action as previously described with reference to FIG. 2 block 215. If the first processor 101 was previously initialized to the second state per block 305, the first action may be performed faster than if the first processor 101 was still in the first state per branch 310 when the second condition was detected.

In response to determining 311 that the second condition has occurred, the method may set 317 a second timer to a second time period. In one example, the second time period may be sufficient to allow a user to instruct the computing device perform a second action within a reasonable time period after performing the first action. In another example, the second time period may be thirty (30) seconds. If the second timer expires 319 prior to the flow chart 300 noticing a third condition 321, then the method may again initialize 301 the first processor 101 to the first state. This may include closing down any software applications launched during the first action and returning the computing device 100 to a fully-locked state.

Otherwise, the first processor 101 may determine 321, within the second time period, that a third condition has occurred and perform 325 a second action. As an example, determining the occurrence of the third condition prior to the expiration of the second timer can be implemented as receiving, from a touch-sensitive display operatively coupled to at least one of the first processor 101 and the second processor 102, a tap, swipe, or other touch gesture indication. Further, the method may determine that the touch gesture indication is substantially similar to a predefined gesture. In response to determining that the touch gesture indication is substantially similar to the predefined gesture, the method may determine 321, by the first processor 101 and within the second time period, that the third condition has occurred. Otherwise, the method may determine that the third condition has not occurred.

In FIG. 3, in response to determining that the third condition has occurred 321 within the second time period, the first processor 101 performs 325 a second action. In one example, the second action may include taking a snapshot or starting a video recording using the camera application. In another example, the second action may include automatically dialing a number using the dialer application. In another example, the second action may include automatically answering an incoming phone call using the dialer application. In another example, the second action may include loading a web page using the browser application.

In accordance with the flow chart 300 of FIG. 3, the first condition, the second condition, and the third condition are segregated to indicate when the first processor 101 should be initialized from the first state to the second state, when the first action should be performed, and when the second action should be performed. By carefully observing user behavior and intelligently defining the first condition, the second condition, the third condition, the first time period, the fifth time period, and the second time period, the computing device may seem to anticipate when a user intends to perform the first action and warm up the first processor 101 from the first state such as a lower-power state to the second state such as a higher-power state after the first condition is satisfied and prior to the user interacting with the computing device to satisfy the second condition or third condition. This has an advantage of decreasing the reaction time of the computing device relative to satisfying the second condition. Then, when the third condition is satisfied within the second time period, the second action may be performed. When the third condition is no longer satisfied within the second time period, the first processor 101 may return to the first state. This may have the effect of shutting down an application when the user no longer interacts with it and consequently reducing power consumption at the computing device. Alternatively, when the third condition is no longer satisfied within the second time period, the first processor 101 may remain in its current state.

Because the paradigms of FIGS. 2-3 may be used in a variety of settings and environments, FIGS. 4-7 describe several different embodiments that may be implemented for blocks 203, 303. Note that, according to FIGS. 4-7, the first condition is a multi-part condition involving a different environmental sensor for each part. By implementing a multi-part first condition, the flow charts 200, 300 of FIGS. 2-3 may avoid prematurely instructing the first processor 101 to change from the first state to the second state.

Figure 4:
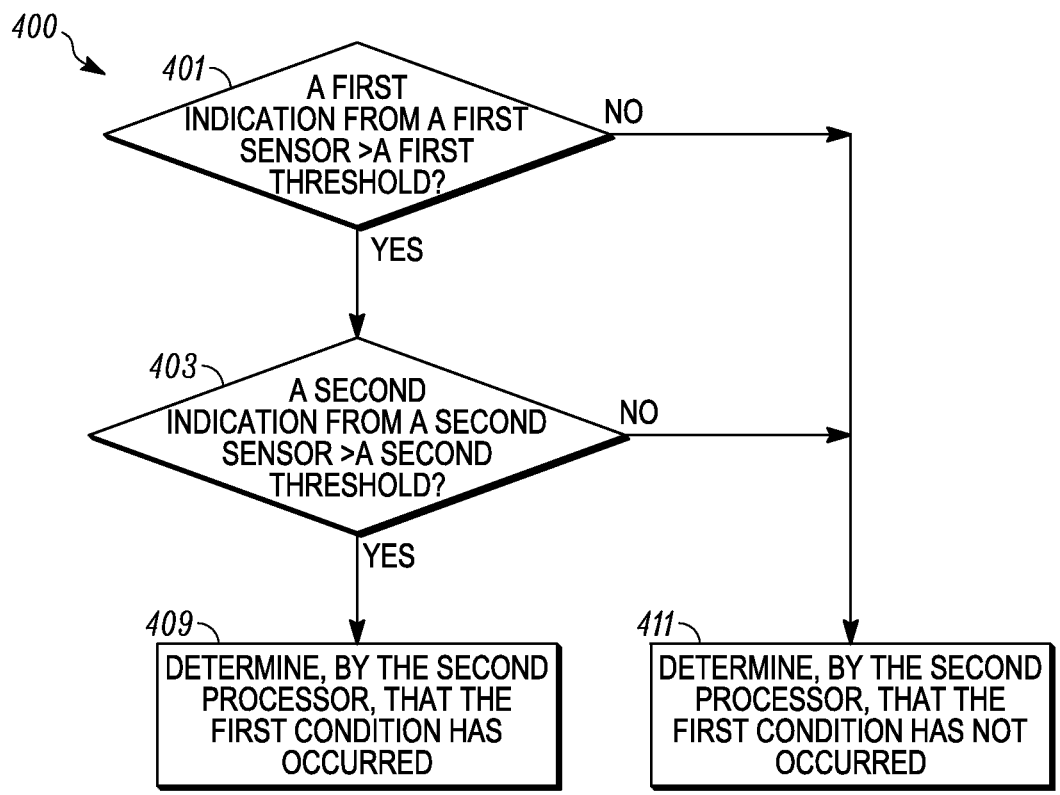
FIG. 4 illustrates one embodiment of a method of determining that a first condition has occurred with various aspects described herein.

FIG. 4 illustrates one embodiment of a flow chart 400 for determining that a first condition has occurred with various aspects described herein. In FIG. 4, the flow chart 400 may begin by receiving 401, from a first sensor operatively coupled to the second processor 102, a first indication. In one example, the first sensor is a motion sensor such as an accelerometer. Further, the method may determine 401 that the first indication is greater than a first threshold. In one example, the first threshold is associated with moving the computing device 100 from a pocket, holster, or purse to a viewing position in preparation for using the computing device as a camera, a browser, or a phone. In other words, an accelerometer reading of a second input component 122 must be above a threshold to indicate a gross movement of the computing device 100. The first threshold may be empirically determined through multi-user testing and stored as a static value in the computing device 100 memory 103 along with other thresholds that will be mentioned later. The first threshold, and other thresholds, may be dynamically determined on an individual basis using a recent history of the device's accelerometer readings and a statistical calculation such that the threshold represents a given number of standard deviations above the mean. Of course, these two methods of creating a threshold may be combined such that the accelerometer reading must be both above the empirically determined value and above the dynamically determined value.

The method may receive 403, from a second sensor operatively coupled to the second processor 102, a second indication. In one example, the second sensor may be an optical sensor such as an ambient light sensor capable of sensing the ambient light in the environment around the computing device. Further, the method may determine 403 that the second indication is greater than a second threshold. In one example, the second threshold may be associated with the computing device 100 not being partially or wholly contained within another object such as a pocket, holster, or purse. In another example, the second threshold may be associated with a user placing the computing device 100 near the user's head or ear. As mentioned previously with respect to the first threshold, the second threshold may be static or dynamic, generally-determined or tailored to the user.

Finally, in response to determining 401 that the first indication is greater than a first threshold and determining 403 that the second indication is greater than a second threshold, the second processor 102 determines 409 that the first condition has occurred with reference to FIGS. 2, 3 blocks 203, 303. Alternatively, in response to determining 401 that the first indication is not greater than a first threshold or determining 403 that the second indication is not greater than a second threshold, the second processor 102 determines 411 that the first condition has not occurred with reference to FIGS. 2, 3 blocks 203, 303.

Although the two different indications 401, 403 are described here as sequentially determined, the order of determination may be reversed or the indications may occur simultaneously. FIG. 4 describes two independent indications for determining that the first condition has occurred with reference to FIGS. 2, 3 blocks 203, 303. In this FIG. 4 example, each indication is directed toward a different aspect of the same user action to help determine that the first condition has occurred; one is directed toward a gross movement of the computing device when a user takes the device from a holstered position to an active position, and the other is directed toward the ambient light around the computing device when the user takes the device from the holstered position to the active position. Additional indications may be added as shown in FIG. 5 to strengthen a determination that a first condition has occurred.

Figure 5:
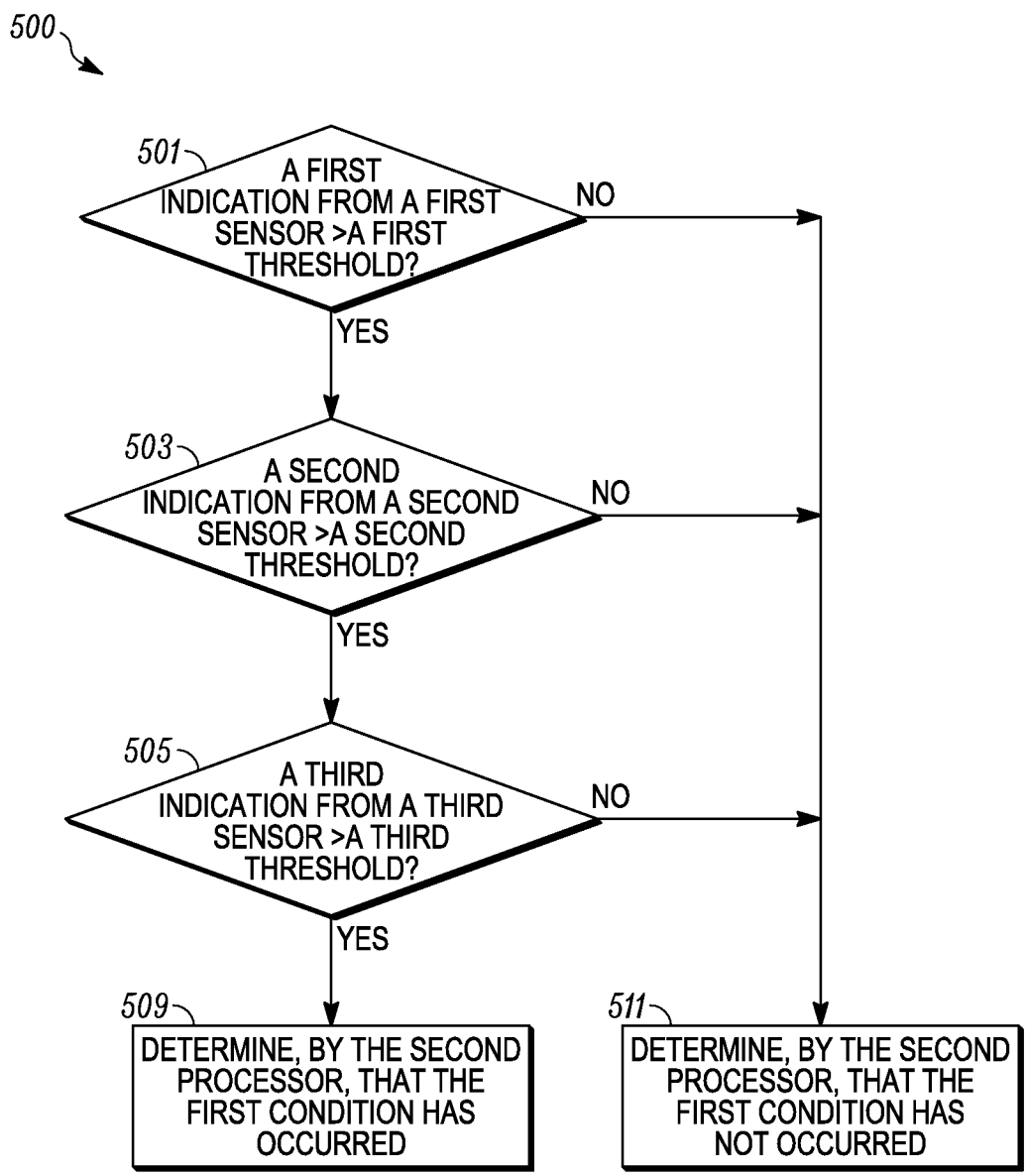
FIG. 5 illustrates another embodiment of a method of determining that a first condition has occurred with various aspects described herein.

FIG. 5 illustrates another embodiment of a method of determining that a first condition has occurred with various aspects described herein. In FIG. 5, a flow chart 500 may begin by receiving 501, from a first sensor operatively coupled to the second processor 102, a first indication as previously describe with reference to FIG. 4 block 401. The method may receive 503, from a second sensor operatively coupled to the second processor 102, a second indication as described with respect to FIG. 4 block 403.

In the current embodiment, the method may receive 505, from a third sensor operatively coupled to the second processor 102, a third indication. In one example, the third sensor may be a presence sensor. In one example, the third sensor may be a presence sensor positioned near a display of the computing device. In another example, the third sensor may be an infrared proximity sensor designed to determine when an object such as a head is near a display of the computing device. Further, the method may determine 505 that the third indication is greater than a third threshold. In one example, the third threshold may be associated with a user positioning the computing device to take a picture. In another example, the third threshold may be associated with a user placing the computing device 100 near the user's head or ear. As mentioned previously with respect to the first threshold, the third threshold may be static or dynamic, generally-determined or tailored to the user.

In FIG. 5, in response to determining 501 that the first indication is greater than the first threshold and determining 503 that the second indication is greater than the second threshold and determining 505 that the third indication is greater than the third threshold, the second processor 102 determines 509 that the first condition has occurred with reference to FIGS. 2, 3 blocks 203, 303. Alternatively, in response to determining 501 that the first indication is not greater than the first threshold or determining 503 that the second indication is not greater than the second threshold or determining 505 that the third indication is not greater than the third threshold, the second processor 102 determines 511 that the first condition has not occurred with reference to FIGS. 2, 3 blocks 203, 303.

Although the three different indications 501, 503, 505 are described here as sequentially determined, the order of determination may be different or the indications may occur simultaneously. FIG. 5 describes using three independent indications for determining that the first condition has occurred with reference to FIGS. 2, 3 blocks 203, 303. In this FIG. 5 example, each indication is directed toward a different aspect of the same user action to help determine that the first condition has occurred; one is directed toward a gross movement of the computing device when a user takes the device from a holstered position to an active position, another is directed toward the ambient light around the computing device when a user takes the device from a holstered position to an active position, and a third is directed toward a user proximity to a display of the computing device when a user takes the computing device from a holstered position to an active position. As mentioned previously, additional indications may be added to strengthen a determination that a first condition has occurred, including to reduce false positive or false negative determinations.

Figure 6:
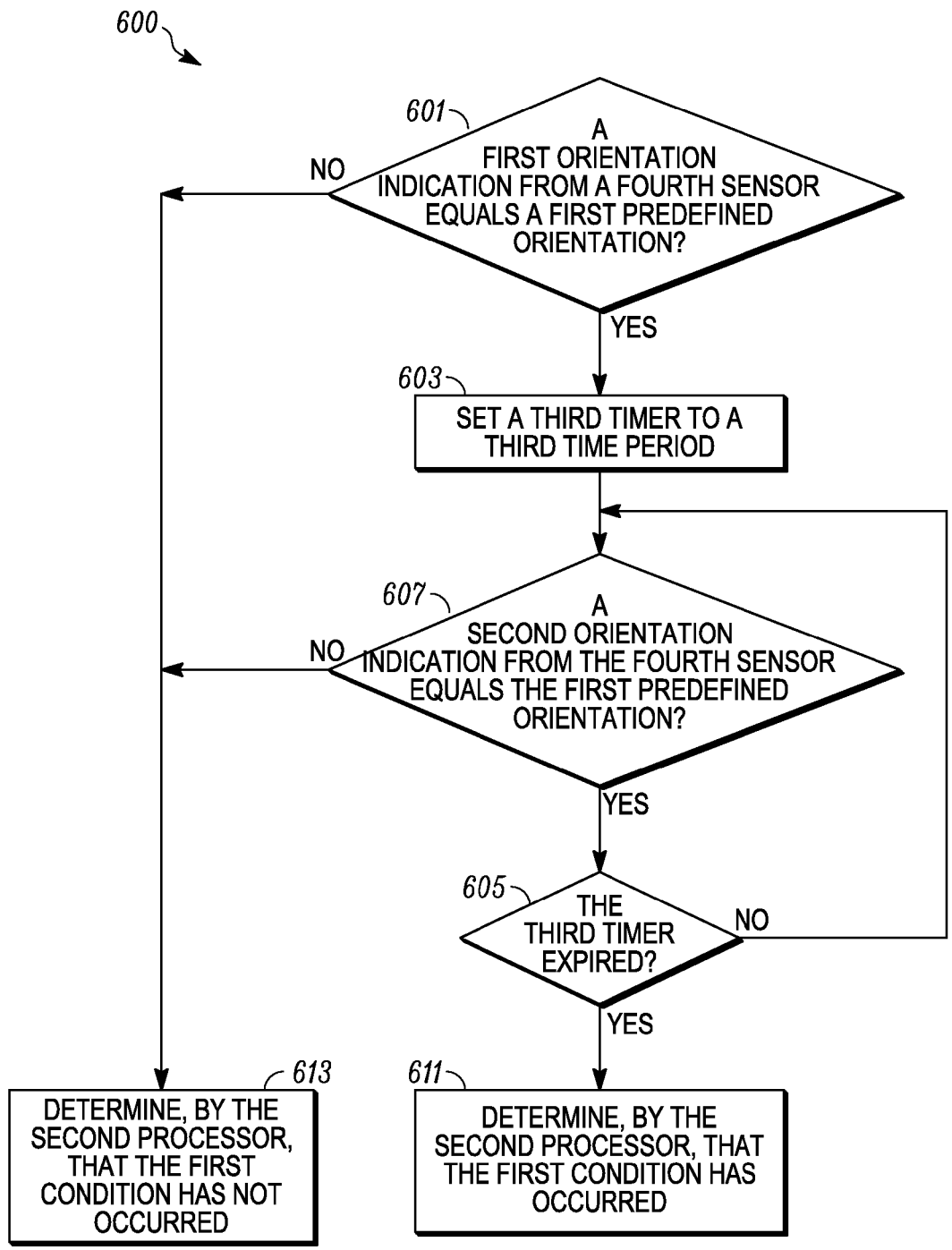
FIG. 6 illustrates another embodiment of a method of determining that a first condition has occurred with various aspects described herein.
Figure 7:
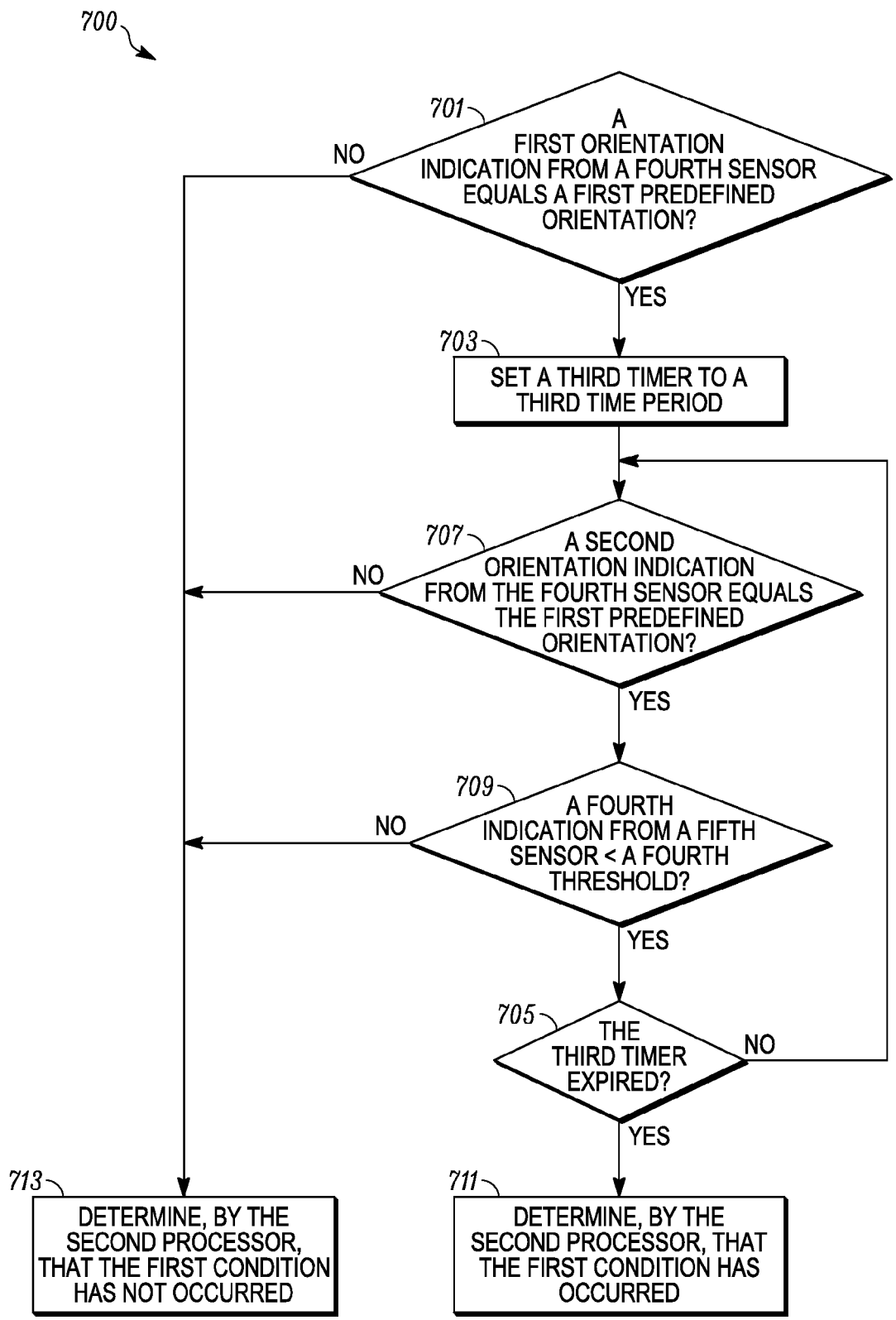
FIG. 7 illustrates another embodiment of a method of determining that a first condition has occurred with various aspects described herein.

FIGS. 6-7 are examples using different environmental indications to determine that the first condition has occurred. In FIGS. 6-7, the first condition as implemented differs slightly from the example first condition of FIGS. 4-5. For example, the first condition for FIGS. 4-5 can be related to bringing the computing device from a holstered position to an active position, while FIGS. 6-7 are directed toward holding the computing device in a specific active position. The indications of FIGS. 6-7 may be wholly or partially concatenated to the indications of FIGS. 4-5 to implement variations of first condition determinations.

FIG. 6 illustrates another embodiment of a flow chart 600 for determining that a first condition has occurred with various aspects described herein. In FIG. 6, the flow chart 600 may begin when a fourth sensor operatively coupled to the second processor 102 receives 601 a first orientation indication associated with a first orientation of the computing device. In one example, the fourth sensor may be a motion sensor such as an accelerometer. In another example, the fourth sensor may be the same as the first sensor of FIGS. 4-5.

Figure 8:
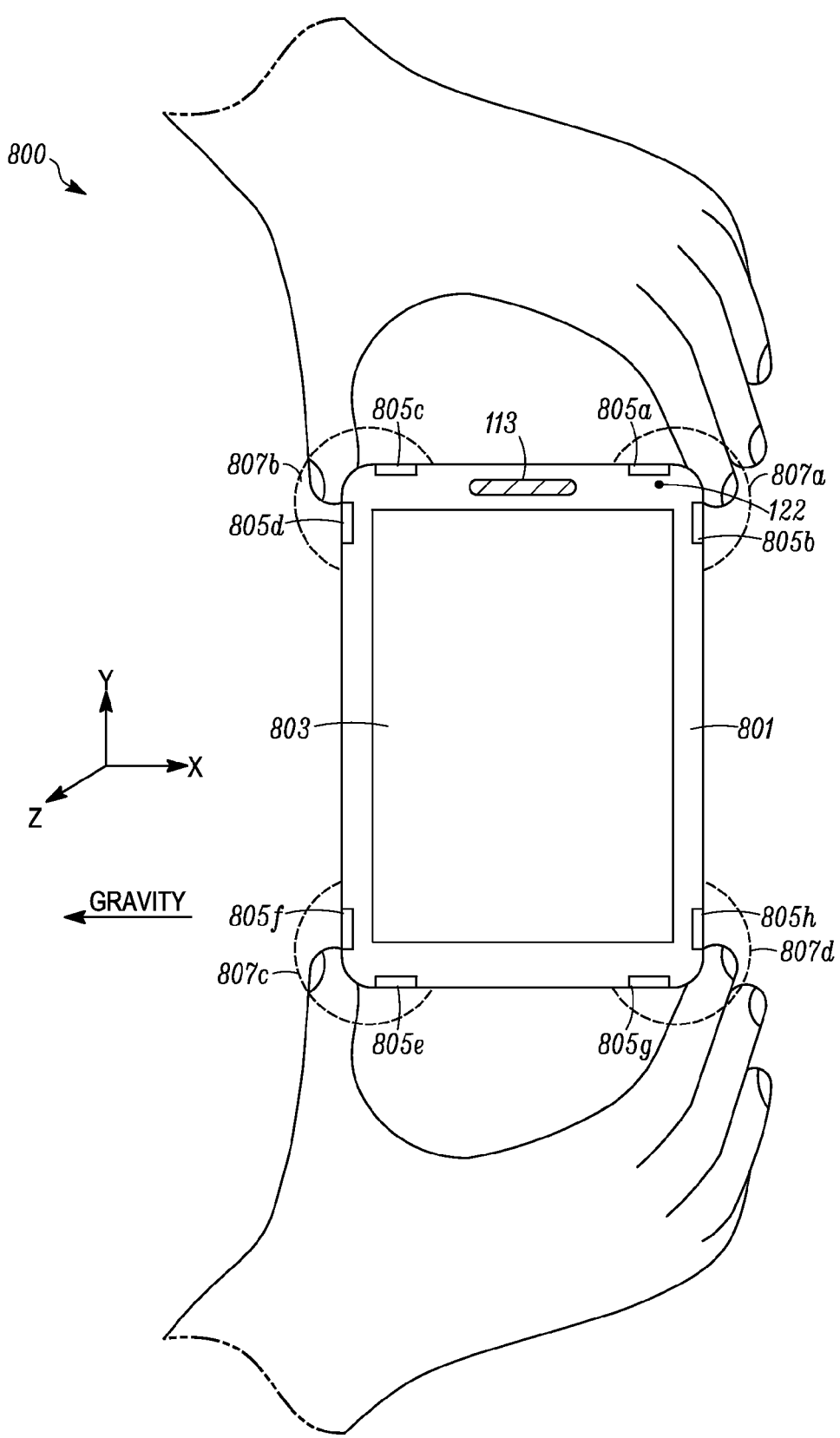
FIG. 8 illustrates one embodiment of a front view of a computing device in landscape orientation with various aspects described herein.
Figure 12:
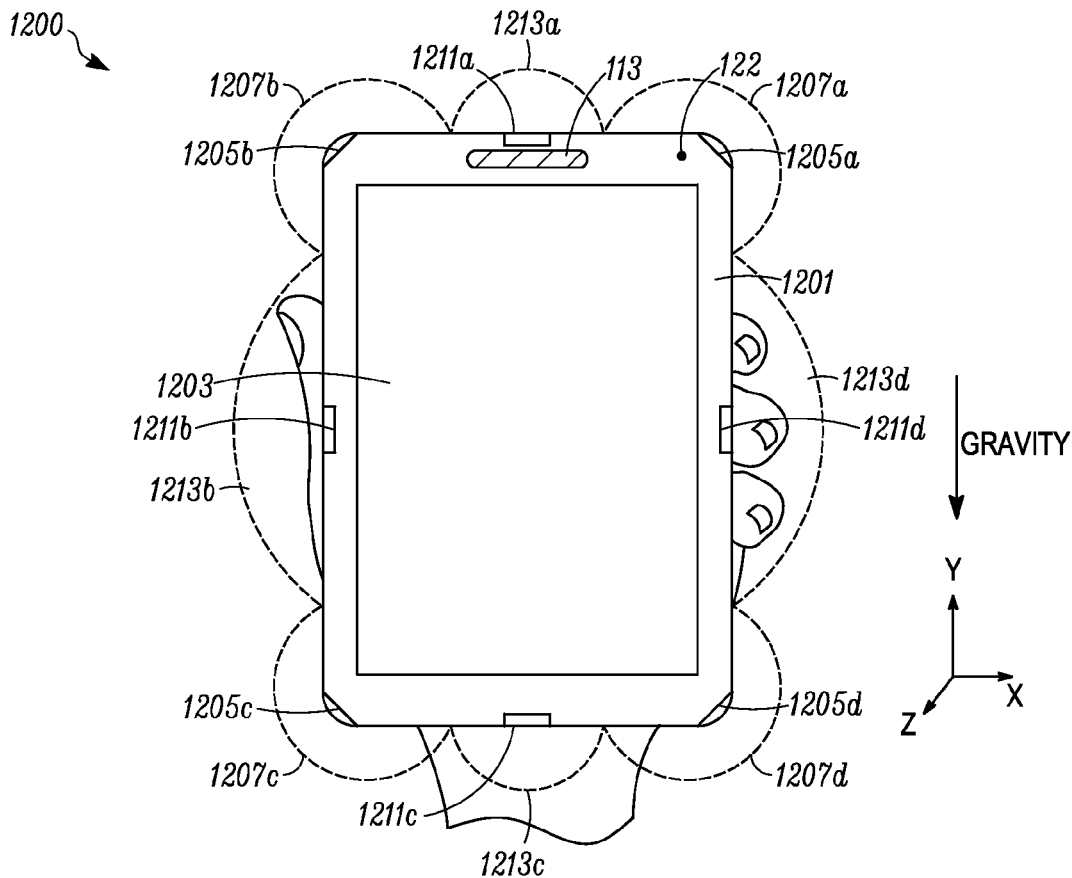
FIG. 12 illustrates another embodiment of a front view of a computing device in portrait orientation with various aspects described herein.

Further, the method may determine that the first orientation is substantially similar to a first predefined orientation of the computing device prior to starting 603 a third time period. In one example, the first predefined orientation may be associated with a user positioning the computing device in preparation to view a display of the computing device. In another example, the first predefined orientation may be associated with a user positioning the computing device in preparation to take a picture. In another example, the first predefined orientation may be associated with a user positioning the computing device at the user's ear in preparation to conduct a phone call. In general, the predefined orientation under consideration in these examples of FIGS. 6-7 may be defined as the user positioning the display 127 substantially parallel to gravity as shown in FIGS. 8 and 12.

The method may set 603 a third timer to the third time period. In one example, the third time period is several milliseconds which is used to determine that the user is intentionally holding the computing device in the first predetermined orientation. In another example, the third time period is 500 milliseconds. During the third time period, the fourth sensor receives 607 one or more second orientation indications associated with secondary orientations of the computing device. Further, the method may determine 607 that the secondary orientations are substantially similar to the first predefined orientation of the computing device prior to the expiration 605 of the third time period.

In the current embodiment, in response to determining 601 that the first orientation is substantially equivalent to the first predefined orientation prior to starting the third time period and determining 607 that the secondary orientations are substantially equivalent to the first predefined orientation during the third time period, the second processor 102 determines 611 that the first condition has occurred. In other words, the orientation of the computing device has remained substantially the same throughout the third time period so the computing device concludes that the user intended to hold the device at the first predefined orientation and thus the first condition is fulfilled with respect to FIGS. 2, 3 blocks 203, 303. Alternatively, in response to determining 601 that the first orientation is not substantially equivalent to the first predefined orientation prior to starting the third time period or determining 607 that the secondary orientations are not substantially equivalent to the first predefined orientation during the third time period, the second processor 102 determines 613 that the first condition has not occurred with reference to FIGS. 2, 3 blocks 203, 303.

According to FIG. 6, the same sensor may determine whether a first predefined orientation is maintained for a third time period. It is possible for an accelerometer sensor to indicate the same orientation for a period of time even while the computing device has moved, which may be acceptable for a particular use case such as when a user operates the computing device while walking or traveling. Alternatively, FIG. 7 illustrates a flow chart 700 which uses a different sensor, such as a gyroscope, to confirm that the computing device has maintained the first predefined orientation without significant movement.

FIG. 7 illustrates another embodiment of a flow chart 700 for determining that a first condition has occurred with various aspects described herein. In FIG. 7, the flow chart 700 may begin when a fourth sensor operatively coupled to the second processor 102 receives 701 a first orientation indication associated with a first orientation of the computing device as previously described with reference to FIG. 6 block 601. Further, the method may determine that the first orientation is substantially similar to a first predefined orientation of the computing device prior to starting 703 a third time period as previously described with reference to FIG. 6 block 601.

The method may set 703 a third timer to the third time period as previously described with respect to FIG. 6 block 603. During the third time period, the fourth sensor receives 707 one or more second orientation indications associated with secondary orientations of the computing device.

In this embodiment, a fifth sensor operatively coupled to the second processor 102 receives 709 a fourth indication. In one example, the fifth sensor may be a motion sensor. In another example, the fifth sensor may be a gyroscope or a magnetometer. In another example, the fifth sensor may be the same as the first sensor or the fourth sensor. Further, the method may determine that the fourth indication 709 is less than a fourth threshold. In one example, the fourth threshold may be associated with the computing device maintaining essentially the same bearing. As mentioned previously with respect to the first threshold, the fourth threshold may be static or dynamic, generally-determined or tailored to the user.

In FIG. 7, in response to determining 701 that the first orientation is substantially equivalent to the first predefined orientation prior to starting the third time period and determining 707 that the secondary orientations are substantially equivalent to the first predefined orientation during the third time period and determining 709 that the fourth indication is less than a fourth threshold during the third time period, the second processor 102 determines 711 that the first condition has occurred. In other words, the orientation and bearing of the computing device has remained substantially the same throughout the third time period so the computing device concludes that the user intended to hold the device at the first predefined orientation and the same heading and thus the first condition is fulfilled with respect to FIGS. 2, 3 blocks 203, 303. Alternatively, in response to determining 701 that the first orientation is not substantially equivalent to the first predefined orientation prior to starting the third time period or determining 707 that the second orientation is not substantially equivalent to the first predefined orientation during the third time period or determining 709 that the fourth indication is not less than the fourth threshold during the third time period, the second processor 102 determines 713 that the first condition has not occurred with reference to FIGS. 2, 3 blocks 203, 303.

Although FIGS. 4-7 present a paradigm where the decisions are binary (YES/NO), these methods may be modified using a probability engine such that one or more of the multiple YES/NO decisions become probability values. Then, the determinations 409, 411, 509, 511, 611, 613, 711, 713 by the second processor may be an average or accumulation (or weighted average or weighted accumulation) of the probability values with a comparison to a total first condition probability threshold such as 75%.

FIG. 8 illustrates one embodiment of a front view of a computing device 800 in a landscape orientation with respect to gravity. In FIG. 8, the computing device 800 may include a housing 801, a touch-sensitive display 803, a first sensor (not shown), a fourth sensor (not shown), and a plurality of ninth sensors 805a to 805h. The housing 801 houses the internal components of the computing device 800 such as the first sensor and those described in FIG. 1 and may frame the display 803 for user-interaction with the computing device 800. The plurality of ninth sensors 805a to 805h may be used individually or in combination to detect the presence of an input object near a plurality of first regions 807a to 807d, respectively. For example, the ninth sensors 805a and 805b may be used to detect the presence of an input object near the region 807a. The ninth sensor may use infrared proximity technology, capacitive sensing technology, resistive sensing technology, surface acoustic wave technology, or other types of sensing technology. In another example, the ninth sensor 805a may be used to detect the presence of an input object near the sensor 805a. An input object may be, for instance, a finger, a thumb, a stylus, or the like. While the plurality of first regions 807a to 807d are illustrated in FIG. 8 in two dimensions, the plurality of first regions 807a and 807d may extend in three dimensions to include areas in, around, above, and below the computing device 800.

In FIG. 8, each of the plurality of ninth sensors 805a to 805h may be used individually or in combination to detect a gesture of the input object and associate the gesture with performing an action in the computing device 800. For example, one or more taps of an input object near one or more of the plurality of ninth sensors 805a to 805h may trigger an action by the computing device 800. In another example, the ninth sensor 805b may be used in combination with the ninth sensor 805a to detect a gesture of an input object such as a swipe near a corner the computing device 800. In determining the swipe, an elapsed time period may be considered for an input object traversing near the first region 807a and toward the first region 807b. Further, the direction of the swipe may be used to perform two different actions or two opposite actions such as zooming in and zooming out an image displayed on the display 803 or increasing the volume and decreasing the volume of a speaker operatively coupled to the computing device 800. A person of ordinary skill in the art will recognize the timing requirements associated with detecting a gesture under such circumstances.

In operation, for example, a user may hold the computing device 800 while the first processor 101 is in an inactive state and the second processor 102 is in an active state as referenced at blocks 201 and 301 of FIGS. 2 and 3. The computing device 800 may use a first sensor and a fourth sensor to determine that the computing device 800 is in a first orientation substantially similar to a predefined orientation for a third time period, as referenced in FIGS. 2, 3 blocks 203, 203 and FIG. 6 flow chart 600.

In one example, the first sensor may be a motion sensor such as an accelerometer or a gyroscope. The predefined orientation may correspond to the expected orientation of the computing device 800 during a typical user-interaction for a particular use case. For example, the predefined orientation may correspond to a user interaction to initially prepare the computing device 800 to capture an image using a camera component of the computing device 800. In another example, the predefined orientation may be associated with the display 803 being positioned substantially parallel to the direction of gravity. Note that the display 803 may be positioned in either a landscape screen format (as shown in FIG. 8) or a portrait screen format (as shown in FIG. 12) and still be substantially parallel to the direction of gravity. As noted in FIG. 8, the orientation axes of the computing device 800 are relative to the device itself. An XY-plane defines a width and height of a main display while the Z-axis is normal to the main display and oriented toward a viewer. Although gravity may be in any direction relative to the computing device 800, FIG. 8 shows gravity pulling in the −X direction in this example. In another example, the predefined orientation may be associated with the computing device 800 being in a typical orientation for another type of operation.

In response to determining that the computing device 800 has fulfilled the first condition described with respect to FIGS. 2, 3 blocks 203, 303, the computing device 800 initializes the first processor 101 into a second state such as an active state, as referenced at blocks 205 and 305 of FIGS. 2 and 3.

Moving to a detection 211, 311 of a second condition as referenced in FIGS. 2, 3, the first processor 101 in the second state may detect the presence of an input object near a plurality of first regions 807a to 807d of the computing device 800 using one or more of the plurality of ninth sensors 805a to 805h. In one example, the computing device 800 may place one or more of the plurality of ninth sensors 805a to 805h into an active mode during the initialization of the computing device 800 into the second state. In one example, the plurality of ninth sensors 805a to 805h may be presence sensors positioned near the corners of the computing device 800 to detect the presence of an input object near one or more of the plurality of first regions 807a to 807d. In another example, the plurality of ninth sensors 805a to 805h may be positioned near the sides or edges of the computing device 800.

In response to determining 311 that the second condition has occurred per FIG. 3, the computing device 800 may provide 313 a notification, as referenced in FIG. 3. In one example, the computing device 800 may provide an audio notification such as a beep using a speaker output component 113 when input objects are concurrently detected at all four first regions 807a to 807d. In another example, the computing device 800 may provide a visual notification by flashing an LED output component 121. In another example, the computing device 800 may provide a tactile vibration using a haptic output component 113. Various configurations of output components 113, 121 may be used to provide notifications, and different notifications may be provided in response to different detected second conditions.

While the computing device 800 is in the second state, the computing device 800 may perform 215, 315 a first action based on a detected second condition, as referenced in FIGS. 2 and 3, where the user interaction includes having one or more input objects near one or more of the plurality of first regions 807a to 807d. In one example, the first action may respond to a user-interaction having one or more fingers near one or more corners of the computing device 800 corresponding to one or more of the plurality of first regions 807a to 807d. In another example, the first action may respond to a user-interaction having one finger or thumb on each of the corners of the computing device 800 corresponding to all of the plurality of first regions 807a to 807d. In another example, the first action may respond to the computing device 800 being in a position to capture an image using a capture device of the computing device 800. In another example, the first action may include securely unlocking the computing device 800. In another example, the first action may include launching an application such as a camera application, a phone dialer application, or a browser application.

The user-interaction may use an input object to perform a gesture such as a tap near one or more of the plurality of first regions 807a to 807d to fulfill a third condition and thus instruct the computing device 800 to perform 321, 325 a second action in accordance with FIG. 3. In one example, the second action may include taking a snapshot using the camera application. In another example, the second action may include placing a call using the dialer application. In another example, the second action may include loading a web page using the browser application.

In another embodiment, the computing device 800 may detect a second condition based on the movement of the computing device 800 as captured by another sensor of the computing device 800 such as an accelerometer or a gyroscope. In one example, the computing device 800 may place the other sensor into an active mode during the initialization of the computing device 800 to the second state as described with respect to FIGS. 2, 3 blocks 205, 305. The computing device 800 may perform 215, 315 the first action based on a first movement gesture of the computing device 800 being substantially similar to a predetermined movement gesture as described with respect to FIGS. 2, 3. For example, the predetermined movement gesture of the computing device 800 may be an up-and-down movement of the computing device 800 relative to gravity. In another example, the predetermined movement gesture of the computing device 800 may be a figure-eight movement of the computing device 800.

In another example, the predetermined movement gesture of the computing device 800 may be a jerk movement of the computing device 800 in the +Z-axis direction followed by a jerk movement in the −Z-axis direction. A jerk is a first derivative of acceleration with respect to time. A jerk movement would be registered when the jerk value (as calculated from a time derivative of an accelerometer output) is above a threshold. As mentioned previously with respect to the first threshold, this threshold may be static or dynamic, generally-determined or tailored to the user. Natural body movements tend to minimize jerk, so motions that create a significant jerk value should be easily distinguishable from natural body movements. In yet another example, the predetermined movement gesture of the computing device 800 may be a jerk movement of the computing device 800 in a clockwise direction around a Y-axis followed by a jerk movement in an anti-clockwise direction around the Y-axis. Of course, other axes may be used as a rotational axis, such as an X-axis or an axis represented by a line such as one from the upper left corner of the display to the lower right corner of the display (or from the lower left corner of the display to the upper right corner of the display). Thus, both the derivative of a linear acceleration and the derivative of an angular acceleration may produce jerk values.

In one definition, a double-jerk movement is a jerk movement in a first direction followed by a jerk movement in a second direction. The second direction may be opposite to the first direction as described previously in both a linear and a rotational situation. In another example, the predetermined movement gesture of the computing device 800 may be a single jerk movement of the computing device 800. Also, more than two jerk movements may be concatenated to define a predetermined movement gesture. For example, both linear and rotational jerk segments may be combined in a gesture that moves the computing device 100 in a first linear jerk direction, in a linear jerk direction opposite the first linear direction, and then a rotational jerk around any axis.

Several examples of methods for determining that a second condition has occurred will be described with reference to FIGS. 9-11 and 13-15. Given the use case proposed in FIG. 8, FIGS. 9-11 describe various multi-part elements for various second conditions. Based on the descriptions given, these elements may be modified for different use cases, different second condition definitions, and different first actions.

Figure 9:
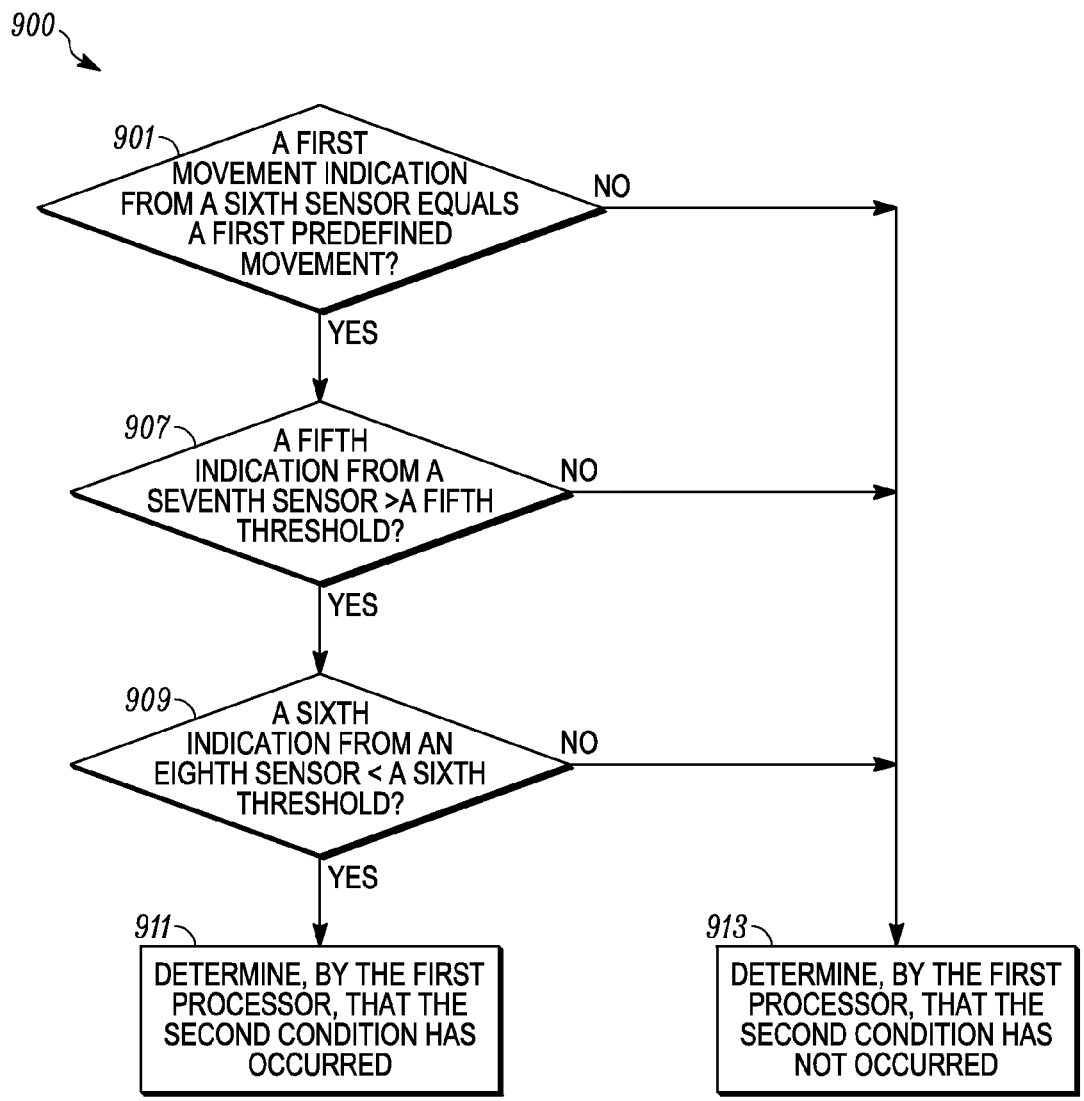
FIG. 9 illustrates one embodiment of a method of determining that a second condition has occurred with various aspects described herein.

FIG. 9 illustrates one embodiment of a flow chart 900 for determining that a second condition has occurred with various aspects described herein. In FIG. 9, the flow chart 900 may begin by receiving 901, from a sixth sensor operatively coupled to at least one of the first processor 101 and the second processor 102, a first movement indication associated with a first movement of the computing device. In one example, the sixth sensor may be a motion sensor such as an accelerometer. In another example, the sixth sensor may be the same as the first sensor or the fourth sensor. The method may determine 901 that the first movement indication is substantially similar to a first predefined movement gesture such as an up-and-down movement, a figure-eight movement, a linear single jerk movement, a linear double-jerk movement, a rotational single-jerk movement, or a rotational double jerk movement previously described with respect to FIG. 8.

In FIG. 9, the method may receive 907, from a seventh sensor operatively coupled to at least one of the first processor 101 and the second processor 102, a fifth indication associated with the amount of ambient light in the environment around the computing device. In one example, the seventh sensor may be an optical sensor such as an ambient light sensor. In another example, the seventh sensor may be the same as the second sensor. Further, the method may determine 907 that the fifth indication is greater than a fifth threshold. In one example, the fifth threshold may be associated with the computing device not being partially or wholly contained within another object such as a pocket, holster, or purse. In another example, the fifth threshold may be associated with the computing device being placed near an ear. As mentioned previously with respect to the first threshold, the fifth threshold may be static or dynamic, generally-determined or tailored to the user.

In this embodiment, the method may receive 909, from an eighth sensor operatively coupled to at least one of the first processor 101 and the second processor 102, a sixth indication. In one example, the eighth sensor may be a motion sensor. In another example, the eighth sensor may be a gyroscope operatively coupled to the first processor 101. In another example, the eighth sensor may be the same as the fifth sensor. Further, the method may determine 909 that the sixth indication is less than a sixth threshold. In one example, the sixth threshold may be associated with the computing device substantially maintaining a certain orientation, which would help to confirm a jerk movement or a double-jerk movement in a linear direction. In another example, the sixth threshold may be associated with the computing device substantially maintaining a certain heading, which would help to confirm a jerk movement or a double-jerk movement in a linear direction. In yet another example, the sixth threshold may be associated with the computing device rotating a certain amount, which would help to confirm a jerk movement or a double-jerk movement in a rotational direction. As mentioned previously with respect to the first threshold, the sixth threshold may be static or dynamic, generally-determined or tailored to the user.

In FIG. 9, in response to determining that the first movement is substantially similar to the first predefined movement and determining that the fifth indication is greater than the fifth threshold and determining that the sixth indication is less than the sixth threshold, the first processor 101 determines 911 that the second condition has occurred. Alternatively, in response to determining that the first movement is not substantially similar to the first predefined movement or determining that the fifth indication is not greater than the fifth threshold or determining that the sixth indication is not less than the sixth threshold, the first processor 101 determines 913 that the second condition has not occurred.

Although the three different indications 901, 907, 909 are described here as sequentially determined, the order of determination may be different or the indications may occur simultaneously. FIG. 9 describes evaluating three separate factors in order to determine whether the second condition has occurred; additional independent indications may be added to strengthen a determination that a second condition has occurred, including to reduce false positive or false negative determinations. In these examples, each separate factor is directed toward a different aspect of the same user action to help determine that the second condition has occurred; one is directed toward an accelerometer-sensed movement of the computing device, another is directed toward the ambient light around the computing device, and a third is directed toward a gyroscopically-sensed movement of the computing device. While the first processor is in the second state, in this example, the computing device evaluates these three factors to determine when the user moves the computing device in a particular pattern or gesture movement to fulfill the second condition described with reference to FIGS. 2-3 blocks 211, 311.

Figure 10:
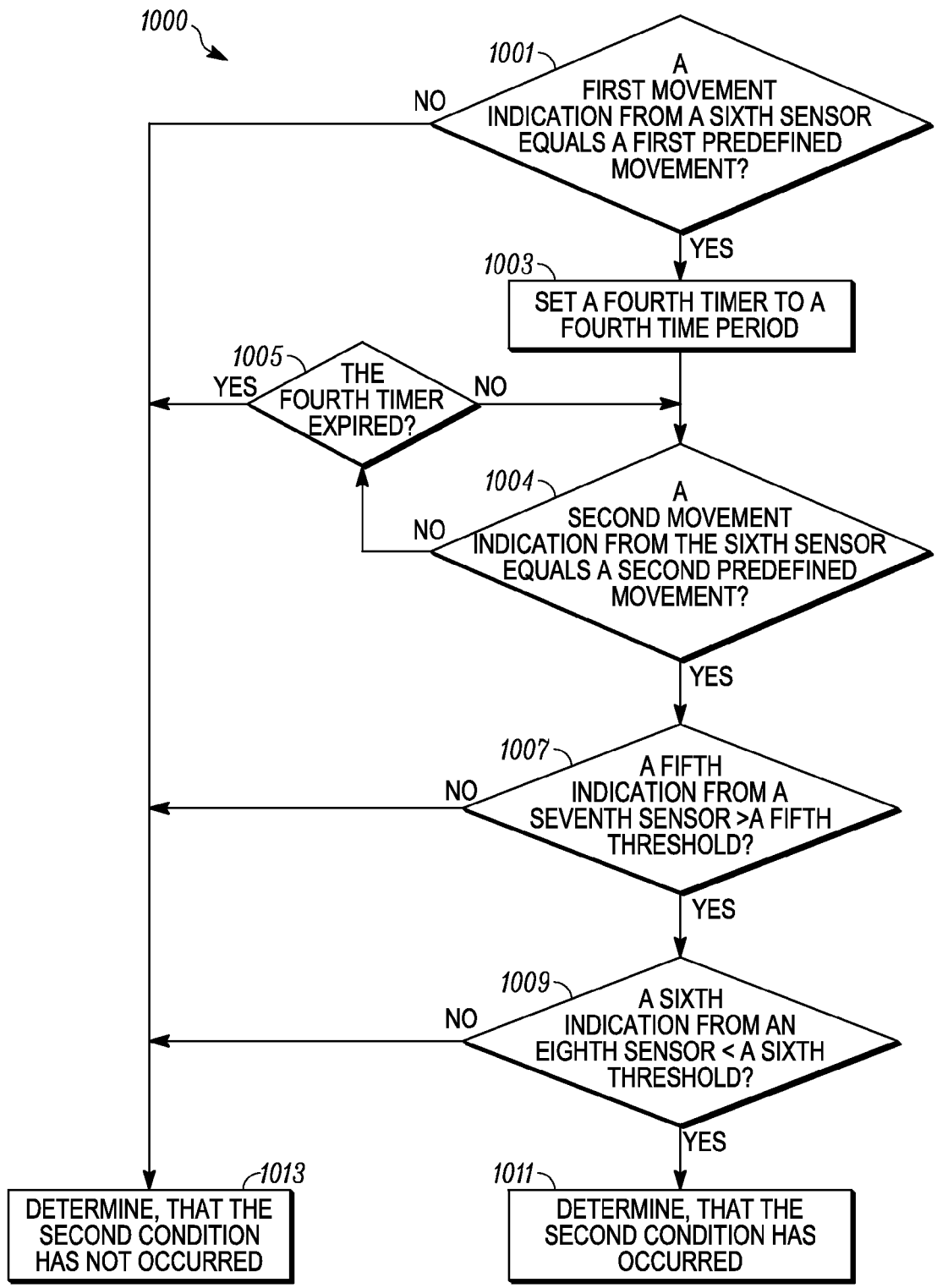
FIG. 10 illustrates another embodiment of a method of determining that a second condition has occurred with various aspects described herein.

FIG. 10 illustrates another embodiment of a flow chart 1000 for determining that a second condition has occurred with various aspects described herein. In FIG. 10, the flow chart 1000 may begin by receiving 1001, from a sixth sensor operatively coupled to at least one of the first processor 101 and the second processor 102, a first movement indication associated with a first movement of the computing device as described previously with respect to FIG. 9 block 901. Further, the method may determine 1001 that the first movement is substantially similar to a first predefined movement gesture such as a single linear or rotational jerk movement as previously described with respect to FIG. 8. In one example, the first predefined movement may be the up movement of the up-and-down movement of the computing device. In another example, the first predefined movement may be the first (linear or rotational) jerk movement of the double jerk movement of the computing device.

In FIG. 10, the method may set 1003 a fourth timer to a fourth time period. In one example, the fourth time period may be associated with a typical time period to perform a second predefined movement gesture. In another example, the fourth time period may be associated with a typical time period to perform a second jerk movement soon after a first jerk movement. A person of ordinary skill in the art will recognize a typical time period for a user to deliberately perform the second predefined movement. The method may receive 1004, from the sixth sensor, a second movement indication associated with a second movement of the computing device. Further, the method may determine 1004 that the second movement is substantially similar to the second predefined movement prior to the expiration 1005 of the fourth time period. In one example, the second predefined movement may be the down movement of the up-and-down movement of the computing device. In another example, the second predefined movement may be the second (linear or rotational) jerk movement of the double jerk movement of the computing device. In another example, the first predefined movement and the second predefined movement may form a contiguous movement of the computing device.

In this embodiment, the method may receive 1007, from a seventh sensor operatively coupled to at least one of the first processor 101 and the second processor 102, a fifth indication associated with the amount of ambient light in the environment around the computing device as previously described with respect to FIG. 9 block 907. Further, the method may determine 1007 that the fifth indication is greater than a fifth threshold as previously described with respect to FIG. 9 block 907.

In FIG. 10, the method may receive 1009, from an eighth sensor operatively coupled to at least one of the first processor 101 and the second processor 102, a sixth indication as previously described with respect to FIG. 9 block 909. Further, the method may determine 1009 that the sixth indication is less than a sixth threshold as previously described with respect to FIG. 9 block 909.

In FIG. 10, in response to determining that the first movement is substantially similar to the first predefined movement and the second movement is substantially similar to the second predefined movement and performed within a fourth time period and also determining that the fifth indication is greater than the fifth threshold and determining that the sixth indication is greater than the sixth threshold, the first processor 101 may determine 1011 that the second condition has occurred. Alternatively, in response to determining that the first movement is not substantially similar to the first predefined movement or the second movement is not substantially similar to the second predefined movement or the second movement is not performed quickly enough after the first movement or determining that the fifth indication is not greater than the fifth threshold or determining that the sixth indication is not less than the sixth threshold, the first processor 101 may determine 1013 that the second condition has not occurred.

Figure 11:
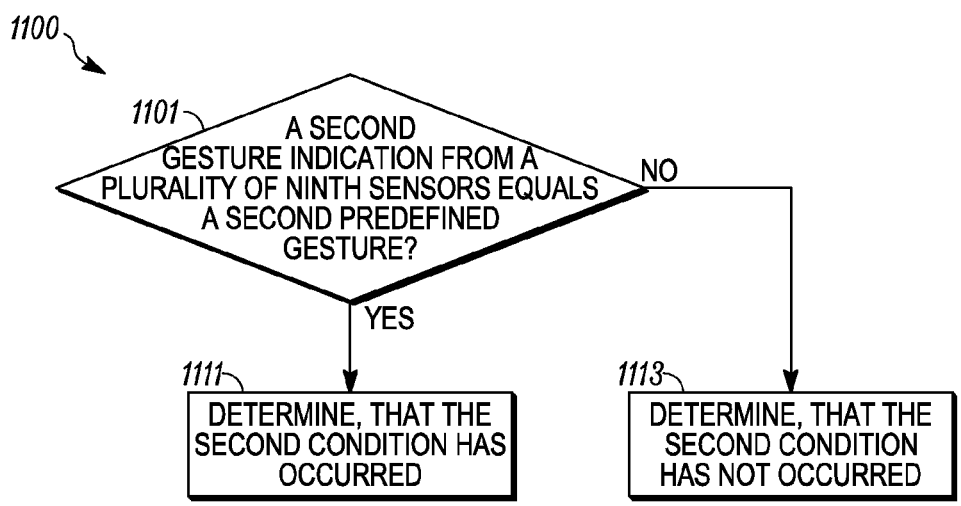
FIG. 11 illustrates another embodiment of a method of determining that a second condition has occurred with various aspects described herein.

FIG. 11 illustrates another embodiment of a flow chart 1100 for determining that a second condition has occurred with various aspects described herein. In FIG. 11, the flow chart 1100 may begin by receiving 1101, from a plurality of ninth sensors 805a to 805h operatively coupled to at least one of the first processor 101 and the second processor 102, a second gesture indication associated with a second gesture. Further, the method may determine 1101 that the second gesture is substantially similar to a second predefined gesture. In response to determining that the second gesture is substantially similar to the second predefined gesture, the first processor 101 may determine 1111 that the second condition has occurred. Alternatively, in response to determining that the second gesture is not substantially similar to the second predefined gesture, the first processor 101 may determine 1113 that the second condition has not occurred.

In addition to positive indications from various sensors that assist the computing device 800 to determine that a second condition has been fulfilled, various embodiments contemplate that negative indications from various sensors may assist the computing device 800 to determine that a second condition has been fulfilled. Although FIGS. 9-11 present a paradigm where the decisions are binary (YES/NO), these methods may be modified using a probability engine such that one or more of the multiple YES/NO decisions become probability values. Then, the determinations 911, 913, 1011, 1013, 1111, 1113 by the second processor, or the first processor in the second state, may be an average or accumulation (or weighted average or weighted accumulation) of the probability values with a comparison to a total second probability threshold such as 85%.

FIG. 12 illustrates another embodiment of a front view of a computing device 1200 in portrait orientation with various aspects described herein. According to FIG. 12, the computing device 1200 includes a housing 1201, a touch-sensitive display 1203, a first sensor (not shown), a plurality of ninth sensors 1205a to 1205d, and a plurality of tenth sensors 1211a to 1211d. The housing 1201 houses the internal components of the computing device 1200 such as the first sensor and those described in FIG. 1 and may frame the display 1203 such that the display 1203 is exposed for user-interaction with the computing device 1200. The plurality of ninth sensors 1205a to 1205d may be used individually or in combination, including with any of the plurality of tenth sensors 1211a to 1211d, to detect the presence of an input object near a plurality of first regions 1207a to 1207d. For example, the ninth sensor 1205a may be used to detect the presence of an input object near the first region 1207a. In another example, the ninth sensor 1205a may be used in combination with the adjacent tenth sensor 1211a and the adjacent tenth sensor 1211d to detect the presence of an input object near the first region 1207a.

In addition, each of the plurality of ninth sensors 1205a to 1205d may be used individually or in combination, including with any of the plurality of tenth sensors 1211a to 1211d, to detect a gesture of the input object associated with performing an action on the computing device 1200. For example, one or more taps of an input object near one or more of the plurality of ninth sensors 1205a to 1205d may direct the computing device 1200 to perform an action. While the plurality of first regions 1207a to 1207d are illustrated in FIG. 12 in two dimensions, the plurality of first regions 1207a and 1207d may extend in three dimensions to include areas in, around, above and below the computing device 1200.

In FIG. 12, the plurality of tenth sensors 1211a to 1211d may be used individually or in combination, including with any of the plurality of ninth sensors 1205a to 1205d, to detect the presence of an input object near any of the plurality of second regions 1213a to 1213d. For example, the tenth sensor 1211a may be used to detect the presence of an input object near the second region 1213a. In addition, each of the plurality of tenth sensors 1211a to 1211d may be used individually or in combination, including with any of the plurality of ninth sensors 1205a to 1205d, to detect a gesture of the input object associated with performing an action at the computing device. For example, one or more taps of an input object near one or more of the plurality of tenth sensors 1211a to 1211d may direct the computing device 1200 to perform an action. In another example, the tenth sensor 1211d may be used in combination with an adjacent ninth sensor 1205a and another adjacent ninth sensor 1205d to detect a gesture of an input object such as a swipe near the right edge of the computing device. In determining the swipe, a certain elapsed time may be considered for an input object traversing near the first sub-region 1207a, the second sub-region 1213d, and the third sub-region 1207d. Further, the direction of the swipe may be used to perform two different actions or two opposite actions such as zooming in and zooming out an image displayed on the display 1203 or increasing the volume and decreasing the volume of a speaker operatively coupled to the computing device. A person of ordinary skill in the art will recognize the timing requirements associated with detecting a gesture under such circumstances. While the plurality of second regions 1213a to 1213d are illustrated in FIG. 12 in two dimensions, the plurality of second regions 1213a to 1213d may extend in three dimensions to include areas in, around, above and below the computing device 1200.

In operation, for example, a user may hold the computing device 1200 while the first processor 101 in an inactive state and the second processor 102 in an active state as referenced at blocks 201 and 301 of FIGS. 2 and 3. The computing device 1200 may use a first sensor or a fourth sensor to determine that the computing device 1200 is in a first orientation substantially similar to a predefined orientation for a third time period, as referenced in FIGS. 2, 3 blocks 203, 303 and FIG. 6 flow chart 600.

In one example, the first sensor may be a motion sensor such as an accelerometer or a gyroscope. The predefined orientation may correspond to the expected orientation of the computing device 1200 during a typical user interaction for a particular use case. For example, the predefined orientation may correspond to a user interaction to initially prepare the computing device 1200 to make a telephone call. In another example, the predefined orientation may be associated with the display 1203 being positioned substantially perpendicular to the direction of gravity. In response to determining that the computing device 1200 has fulfilled the first condition described with respect to FIGS. 2, 3 blocks 203, 303, the computing device 1200 initializes the first processor 101 into a second state such as an active state, as referenced at blocks 205 and 305 of FIGS. 2 and 3.

Moving to a detection of a second condition as referenced at FIGS. 2, 3 blocks 211, 311, the first processor 101 in the second state may detect the presence of an input object near the plurality of first regions 1207a to 1207d using the plurality of ninth sensors 1205a to 1205d. In one example, the computing device 1200 may place one or more of the plurality of ninth sensors 1205a to 1205d into an active mode during the initialization of the computing device 1200 to the second state. In one example, the plurality of ninth sensors 1205a to 1205d may be presence sensors positioned near the corners of the computing device 1200 to detect the presence of an input object near one or more of the plurality of first regions 1207a to 1207d, respectively. In addition, the computing device 1200 may detect the presence of an input object near one or more of the plurality of second regions 1213a to 1213d using the plurality of tenth sensors 1211a to 1211d. In one example, the computing device 1200 may place the plurality of tenth sensors 1211a to 1211d into an active mode during the initialization of the computing device 1200 into the second state. In one example, the plurality of tenth sensors 1211a to 1211d may be presence sensors positioned near the sides or edges of the computing device 1200 to detect the presence of an input object near one or more of the plurality of second regions 1213a to 1213d.

While the first processor 101 is in the second state, the computing device 1200 may perform 215, 315 a first action based on a detected second condition, as referenced in FIGS. 2 and 3, where the user interaction includes having one or more input objects near one or more of the plurality of first regions 1207a to 1207d and not having any input objects near the plurality of second regions 1213a to 1213d. In one example, the first action may correspond to a user-interaction having one or more fingers near one or more corners of the computing device 1200 corresponding to one or more of the plurality of first regions 1207a to 1207d and without one or more fingers being near one or more sides of the computing device corresponding to one or more of the plurality of second regions 1213a to 1213d. In another example, the first action may correspond to a user-interaction having one finger or thumb on each of the corners of the computing device 1200 corresponding to one or more of the plurality of first regions 1207a to 1207d and without the one or more fingers or thumbs being near one or more sides of the computing device corresponding to one or more of the plurality of second regions 1213a to 1213d. See the hand positions shown in FIG. 8. In another example, the first action may correspond to a user-interaction having no fingers or thumbs at the corners of the computing device corresponding to one or more of the plurality of first regions 1207a to 1207d and having one or more fingers or thumbs near one or more sides of the computing device corresponding to one or more of the plurality of second regions 1213a to 1213d. See the hand position shown in FIG. 8. In another example, the first action may correspond to the computing device 1200 being in a position to capture an image using a capture device of the computing device 1200. The first action may include securely unlocking the computing device or limiting the capability of the computing device. Further, the first action may include launching a camera application, a phone dialer application, or a browser application.

The user-interaction may use an input object to perform a gesture such as tapping one or more times near one or more of the first regions 1207a to 1207d to fulfill a third condition and thus instruct the computing device 800 to perform 321, 325 a second action in accordance with FIG. 3. For example, the second action may be to capture an image such as a snapshot using a capture device of the computing device 1200. The user-interaction may use the input object to, for instance, slide along the side of the computing device 1200 near one or more of the first regions 1207a to 1207d and one or more of the second regions 1213a to 1213d to perform a second action at the computing device 1200. For example, the second action may be to zoom in or zoom out on an image displayed on the display 1203. In another example, the second action may be to answer a phone call.

Figure 13:
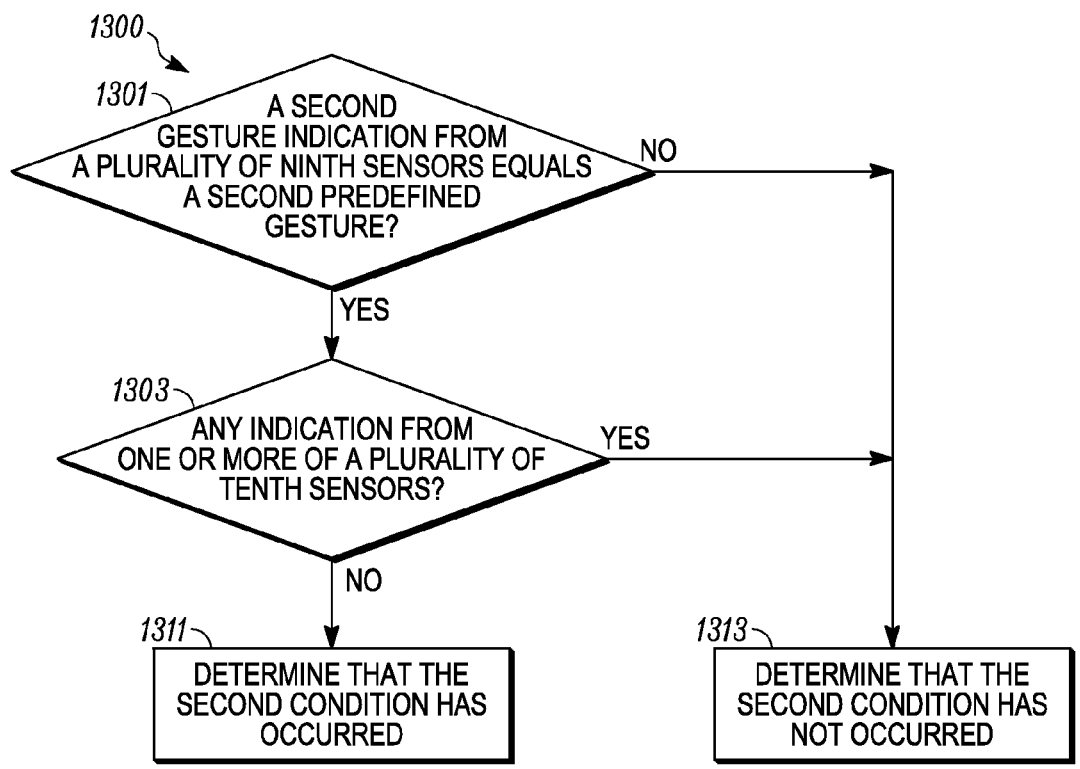
FIG. 13 illustrates another embodiment of a method of determining that a second condition has occurred with various aspects described herein.

FIG. 13 illustrates another embodiment of a method 1300 for determining that a second condition has occurred with various aspects described herein. In FIG. 13, the method 1300 may begin by receiving 1301, from one or more of the plurality of ninth sensors 1205a to 1205d, operatively coupled to at least one of the first processor 101 and the second processor 102, a second gesture indication associated with a second gesture. Further, the method 1300 may determine 1301 that the second gesture is substantially similar to a second pre-defined gesture. The method 1300 may determine 1303 that no indications were received from any of the plurality of tenth sensors 1211a to 1211d operatively coupled to at least one of the first processor 101 and the second processor 102 within the first time period. In response to determining 1301 that the second gesture is substantially similar to a second predefined gesture and determining 1303 that no indications were received from any of the plurality of tenth sensors 1211a to 1211d, the first processor 101 may determine 1311 that the second condition has occurred. Alternatively, in response to determining 1301 that the second gesture is not substantially similar to a second predefined gesture or determining 1303 that an indication was received from one or more of the plurality of tenth sensors 1211a to 1211d, the first processor 101 may determine 1313 that the second condition has not occurred.

Although different indications 1301, 1303, are described here as sequentially determined, the order of determination may be different or the indications may occur simultaneously. FIG. 13 describes using two separate indications for determining that the second condition has occurred; additional independent indications may be added to strengthen a determination that a second condition has occurred, including to reduce false positive or false negative conclusions. In these examples, each separate indication is directed toward a different aspect of the same user action, or lack of user action, to help conclude that the second condition has occurred; one is directed toward a user's physical interaction with a set of first regions 1207 and another is directed toward a user's physical interaction with a set of second regions 1213.

Figure 14:
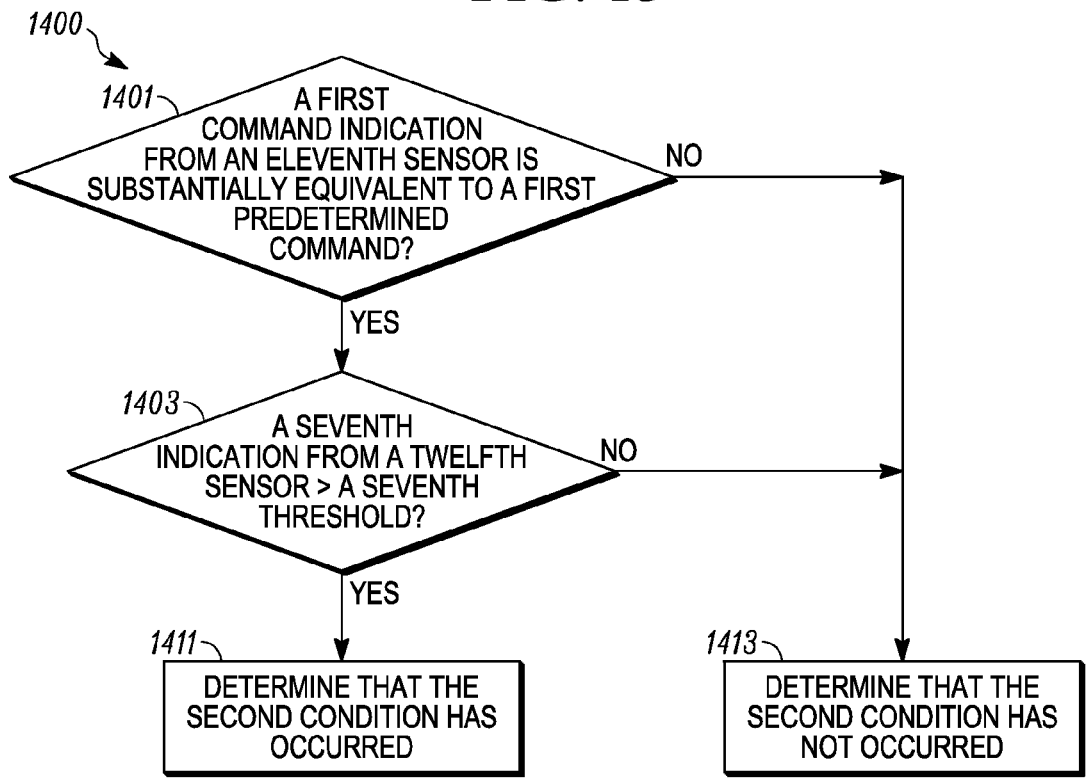
FIG. 14 illustrates another embodiment of a method of determining that a second condition has occurred with various aspects described herein.

FIG. 14 illustrates another embodiment of a flow chart 1400 for determining that a second condition has occurred with various aspects described herein. In FIG. 14, the flow chart 1400 may begin by receiving 1401, from an eleventh sensor operatively coupled to at least one of the first processor 101 and the second processor 102, a first command indication associated with a first command. In one example, the eleventh sensor may be a microphone operatively coupled to at least one of the first processor 101 and the second processor 102. Further, the method may determine 1401 that the first command is substantially similar to a first predetermined command. In one example, the first predetermined command may be a voice command such as "camera," "snap," "search," "browser," "call," or "answer." The method may receive 1403, from a twelfth sensor operatively coupled to at least one of the first processor 101 and the second processor 102, a seventh indication. In one example, the twelfth sensor may be an optical sensor. In another example, the twelfth sensor may be the same as the second sensor or the seventh sensor. Further, the method may determine 1403 that the seventh indication is greater than a seventh threshold. In one example, the seventh threshold may be associated with the computing device not being partially or wholly contained within another object such as a pocket, holster, or purse. In another example, the seventh threshold may be associated with the computing device being placed near an ear. As mentioned previously with respect to the first threshold, the seventh threshold may be static or dynamic, generally-determined or tailored to the user.

In FIG. 14, in response to determining 1401 that the first command is substantially similar to the first predetermined command and determining 1403 that the seventh indication is greater than the seventh threshold, the first processor 101 determines 1411 that the second condition has occurred. Alternatively, in response to determining 1401 that the first command is not substantially similar to the first predetermined command or determining 1403 that the seventh indication is not greater than the seventh threshold, the first processor 101 determines 1413 that the second condition has not occurred.

In operation, for example, the second processor 102 may use one or more indications to determine that a first condition has occurred while the first processor 101 is operating in a first state such as a sleep state, as referenced at blocks 203 and 303 of FIGS. 2 and 3. In response to determining the first condition, the computing device may initialize the first processor 101 into a second state such as an active state, as referenced at blocks 205 and 305 of FIGS. 2 and 3. Also, the computing device may initialize an eleventh sensor such as a microphone and a twelfth sensor such as an optical sensor. Furthermore, the computing device may use one or more indications to determine that a second condition has occurred while the first processor 101 is operating in the active state, as referenced at FIGS. 2, 3 blocks 211, 311 of. For instance, the computing device may receive a first command indication via the microphone. In response, the computing device may determine that the first command is substantially similar to a first predetermined command such as a verbal "snap" command, as referenced in FIG. 14 block 1401. Further, the computing device may receive a seventh indication from the optical sensor. In response, the computing device may determine that the seventh indication is greater than a seventh threshold corresponding to an ambient light environment adequate to capture an image, as referenced in FIG. 14 block

1403. In response to determining the verbal "snap" command and determining an adequate ambient light environment, the computing device may determine 1411 that the second condition has occurred, as referenced in FIG. 14. In response to the second condition occurring, the computing device may provide 313 a user notification, as referenced in FIG. 3. Further, the computing device may perform 315 a first action such as automatically snapping a picture using an image capture device operatively coupled to the computing device, as referenced in FIG. 3.

Although different indications 1401, 1403, are described here as sequentially determined, the order of determination may be different or the indications may occur simultaneously. FIG. 14 describes using separate indications for determining that the second condition has occurred; additional independent indications may be added to strengthen a determination that a second condition has occurred, including to reduce false positive or false negative determinations. In these examples, each separate indication is directed toward a different aspect of the same user action, or lack of user action, to help determine that the second condition has occurred; one is directed toward a user voice command and another is directed toward the ambient light around the computing device.

Figure 15:
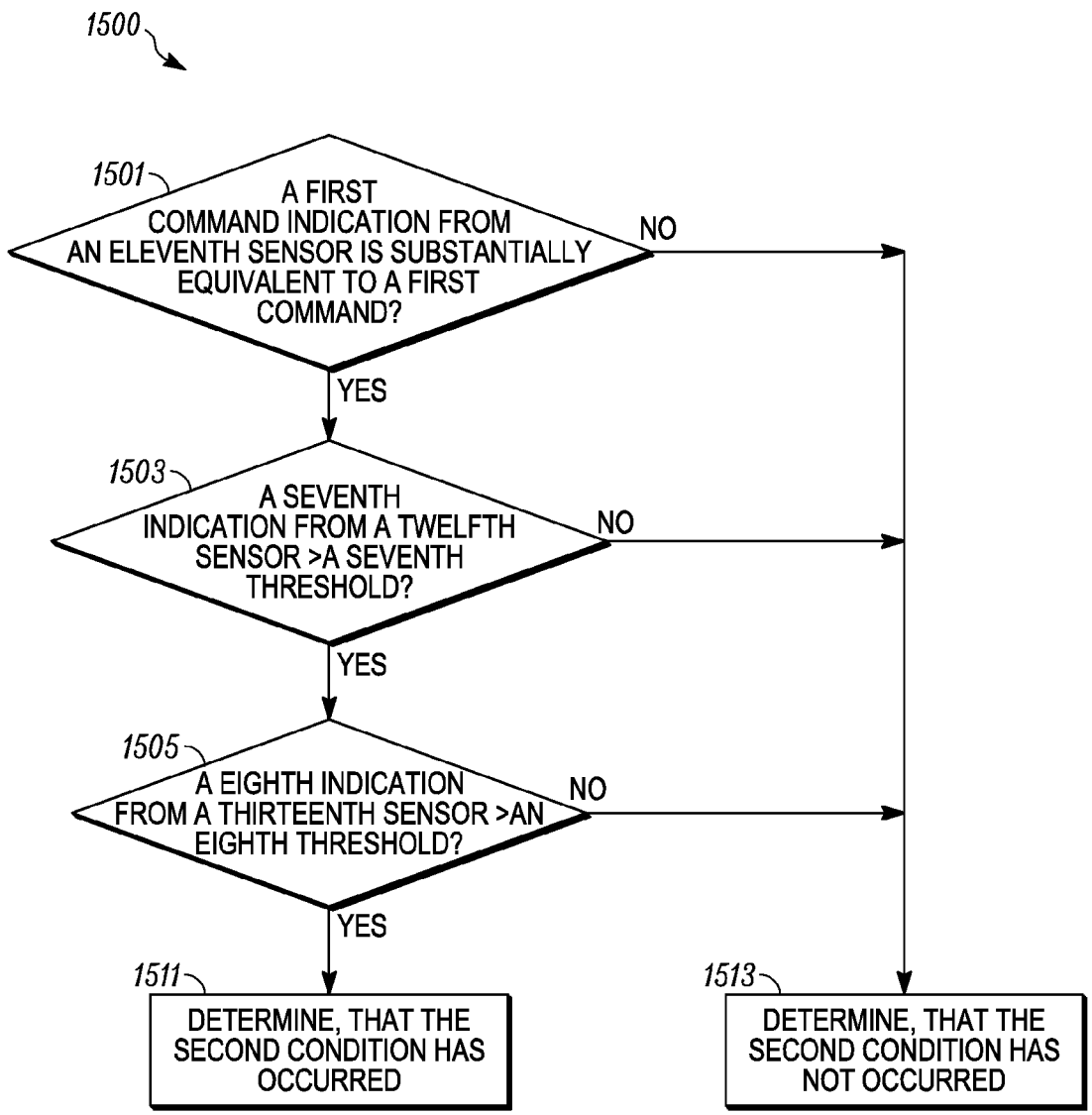
FIG. 15 illustrates another embodiment of a method of determining that a second condition has occurred with various aspects described herein.

FIG. 15 illustrates another embodiment of a flow chart 1500 of determining that a second condition has occurred with various aspects described herein. In FIG. 15, the flow chart 1500 may begin by receiving 1501, from an eleventh sensor operatively coupled to at least one of the first processor 101 and the second processor 102, a first command indication associated with a first command as previously described with reference to FIG. 14 block 1401. Further, the method may determine 1501 that the first command is substantially similar to a first predetermined command as described with reference to FIG. 14 block 1401. The method may receive 1503, from a twelfth sensor operatively coupled to at least one of the first processor 101 and the second processor 102, a seventh indication as described with reference to FIG. 14 block 1403. Further, the method may determine 1503 that the seventh indication is greater than a seventh threshold as previously described with respect to FIG. 14 block 1403.

The method may receive 1505, from a thirteenth sensor operatively coupled to at least one of the first processor 101 and the second processor 102, an eighth indication. In one example, the thirteenth sensor is a presence sensor. In another example, the thirteenth sensor is a proximity sensor. In another example, the thirteenth sensor is the same as the third sensor, the ninth sensor, or the tenth sensor. Further, the method may determine 1505 that the eighth indication is greater than an eighth threshold. In one example, the eighth threshold may be associated with the computing device not being partially or wholly contained within another object such as a pocket or a purse. In another example, the eighth threshold may be associated with a user positioning the computing device to take a picture. In another example, the eighth threshold may be associated with the computing device being placed near an ear. As mentioned previously with respect to the first threshold, the eighth threshold may be static or dynamic, generally-determined or tailored to the user.

In FIG. 15, in response to determining 1501 that the first command is substantially similar to the first predetermined command, determining 1503 that the seventh indication is greater than the seventh threshold, and determining 1505 that the eighth indication is greater than the eighth threshold, the first processor 101 may determine 1511 that the second condition has occurred. Alternatively, in response to determining 1501 that the first command is not substantially similar to the first predetermined command, determining 1503 that the seventh indication is not greater than the seventh threshold, or determining 1505 that the eighth indication is not greater than the eighth threshold, the first processor 101 determines 1513 that the second condition has not occurred.

In operation, for example, the second processor 102 may use one or more indications to determine the first condition while the first processor 101 is operating in the first state such as a sleep state, as referenced at blocks 203 and 303 of FIGS. 2 and 3. The first condition may be determined in a variety of ways using different combinations of sensors as described with reference to FIGS. 4-7. In response to determining the first condition, the first processor 101 initializes to a second state such as an active state, as referenced at blocks 205 and 305 of FIGS. 2 and 3. Also, the computing device may initialize the eleventh sensor such as a microphone, the twelfth sensor such as an optical sensor, and the thirteenth sensor such as a presence sensor. Furthermore, the computing device may use one or more indications to determine the second condition while the first processor 101 is operating in the active state, as referenced at FIGS. 2, 3 blocks 211, 311. The second condition may be determined in a variety of ways using different combinations of sensors as described with reference to FIGS. 9-11 and 13-15. For instance, the computing device may receive a first command indication via the microphone. In response, the computing device may determine that the first command is substantially similar to the first predetermined command such as a verbal "hello" command, as referenced in FIG. 15 block 1501. Further, the computing device may receive a seventh indication from the optical sensor. In response, the computing device may determine that the seventh indication is greater than the seventh threshold corresponding to the computing device being placed near an ear, as referenced in FIG. 15 block 1503. Further, the computing device may receive the eighth indication from the presence sensor. In response, the computing device may determine that the eighth indication is greater than the eighth threshold corresponding to the computing device being placed near an ear, as referenced in FIG. 15 block 1505. In response to determining the verbal "hello" command and determining that the computing device is held near an ear using two different sensors, the computing device may determine that the second condition has occurred, as referenced in FIG. 15 block 1511. In response to the second condition occurring, the computing device may provide 313 a user notification, as referenced in FIG. 3. Further, the computing device may perform 315 the first action such as answering an incoming call, as referenced in FIG. 3.

In another operation, for example, the second processor 102 may use one or more indications to determine that a first condition has occurred while the first processor 101 is operating in a first state such as a sleep state, as referenced at blocks 203 and 303 of FIGS. 2 and 3. In response to determining the first condition, the computing device may initialize the first processor 101 into the second state such as an active state, as referenced at blocks 205 and 305 of FIGS. 2 and 3. Also, the computing device may initialize an eleventh sensor such as a microphone, a twelfth sensor such as an optical sensor, and a thirteenth sensor such as a presence sensor. Furthermore, the computing device may use one or more indications to determine that a second condition has occurred while the first processor 101 is operating in the active state, as referenced at FIGS. 2, 3 blocks 211, 311. For instance, the computing device may receive a first command indication via the microphone. In response, the computing device may determine that the first command is substantially similar to a first predetermined command such as a verbal "browser" command, as referenced in FIG. 15 block 1501.

Further, the computing device may receive a seventh indication from the optical sensor. In response, the computing device may determine that the seventh indication is greater than a seventh threshold corresponding to an ambient light environment when the computing device is in a pocket, holster, or purse, as referenced in FIG. 15 block 1503. Further, the computing device may receive an eighth indication from the presence sensor. In response, the computing device may determine that the eighth indication is greater than an eighth threshold corresponding to the computing device being held in a common grip for browser interactions, as referenced in FIG. 15 block 1505. In response to determining the verbal "browser" command and determining that the computing device is not in a pocket or purse using two different sensors, the computing device may determine that the second condition has occurred, as referenced in FIG. 15 block 1511. In response to the second condition occurring, the computing device may provide 313 a user notification, as referenced in FIG. 3. Further, the computing device may perform the first action such as automatically opening a browser, as referenced at block 315 in FIG. 3.

Although the three different indications 1501, 1503, 1505 are described here as sequentially determined, the order of determination may be different or the indications may occur simultaneously. FIG. 15 describes using three separate indications for determining that the first condition has occurred; additional independent indications may be added to strengthen a determination that a first condition has occurred, including to reduce false positive or false negative determinations. In these examples, each separate indication is directed toward a different aspect of the same user action to help determine that the first condition has occurred; one is directed toward a user voice command, another is directed toward the ambient light around the computing device, and a third is directed toward a user proximity to a display.

Although FIGS. 13-15 present a paradigm where the decisions are binary (YES/NO), these methods may be modified using a probability engine such that one or more of the multiple YES/NO decisions become probability values. Then, the determinations 1311, 1313, 1411, 1413, 1511, 1513 by the second processor, or the first processor in the second state, may be an average or accumulation (or weighted average or weighted accumulation) of the probability values with a comparison to a total second probability threshold such as 85%.

This detailed description is merely illustrative in nature and is not intended to limit the present disclosure, or the application and uses of the present disclosure. Furthermore, there is no intention to be bound by any expressed or implied theory presented in the preceding field of use, background, or this detailed description. The present disclosure provides various examples, embodiments and the like, which may be described herein in terms of functional or logical block elements. Various techniques described herein may be used to initialize a computing device to perform an action. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like. Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a non-transitory computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Throughout the specification and the claims, the following terms take at least the meanings explicitly associated herein, unless the context clearly dictates otherwise. The term "connected" means that one function, feature, structure, component, element, or characteristic is directly joined to or in communication with another function, feature, structure, component, element, or characteristic. The term "coupled" means that one function, feature, structure, component, element, or characteristic is directly or indirectly joined to or in communication with another function, feature, structure, component, element, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to.

In this detailed description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, component, element, or characteristic, but not every embodiment necessarily includes the particular function, feature, structure, component, element, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art will recognize that many further combinations and permutations of the subject innovations are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices, systems, or articles of manufacture described herein are in conjunction with a configuration for the aforementioned initializing a computing device to perform an action, the skilled artisan will readily recognize that the example methods, devices, systems, or articles of manufacture may be used in other methods, devices, systems, or articles of manufacture and may be configured to correspond to such other example methods, devices, systems, or articles of manufacture as needed. Further, while at least one example, embodiment, or the like has been presented in this detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims.

What is claimed is:

1. A method, at a computing device that includes a first processor operatively coupled to a second processor, comprising:
    determining by the second processor that an accelerometer reading of the computing device is above a threshold, the threshold based on a combination of a static value and a dynamically-determined value, wherein the dynamically-determined value is based on a recent history of accelerometer readings;
    waking up the first processor from an inactive mode of operation to an active mode of operation, in response to the determining by the second processor;
    determining by the first processor in response to waking up that a gyroscope reading of the computing device is substantially similar to a predefined movement gesture, wherein the predefined movement gesture comprises a second movement that occurs within a predetermined time period after a first movement; and
    launching a software application, in response to the determining by the first processor.

2. The method of claim 1, wherein the threshold indicates a large movement of the computing device.

3. The method of claim 1, wherein the inactive mode of operation uses less power than the active mode of operation.

4. The method of claim 1, wherein the predefined movement gesture comprises:
    a first jerk movement of the computing device in a clockwise direction; and
    a second jerk movement of the computing device in an anti-clockwise direction.

5. The method of claim 4, wherein the second jerk movement occurs within a predetermined time period after the first jerk movement.

6. The method of claim 1, wherein the predefined movement gesture comprises:
    a first jerk movement of the computing device in an anti-clockwise direction; and
        a second jerk movement of the computing device in a clockwise direction.

7. The method of claim 1, wherein the predefined movement gesture comprises:
    a first jerk movement of the computing device in a first linear direction; and
    a second jerk movement of the computing device in a second linear direction that is opposite the first linear direction.

8. The method of claim 7, wherein the second jerk movement occurs within a predetermined time period after the first jerk movement.

9. The method of claim 1, wherein the launching comprises: securely unlocking the computing device.

10. The method of claim 9, wherein the software application comprises: a camera application.

11. The method of claim 1, wherein the software application comprises: a browser application.

* * * * *